United States Patent
Kim et al.

(10) Patent No.: US 12,495,556 B2
(45) Date of Patent: Dec. 9, 2025

(54) MEMORY DEVICES

(71) Applicant: Samsung Electronics Co., Ltd., Suwon-si (KR)

(72) Inventors: Byungsoo Kim, Anyang-si (KR); Sangwan Nam, Hwaseong-si (KR); MinJae Seo, Suwon-si (KR); Bongsoon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 17/863,697

(22) Filed: Jul. 13, 2022

(65) Prior Publication Data

US 2023/0123297 A1 Apr. 20, 2023

(30) Foreign Application Priority Data

Oct. 20, 2021 (KR) .......................... 10-2021-0140082

(51) Int. Cl.
*H10B 41/27* (2023.01)
*H10B 41/50* (2023.01)
*H10B 43/27* (2023.01)
*H10B 43/50* (2023.01)

(52) U.S. Cl.
CPC ............. *H10B 43/50* (2023.02); *H10B 41/27* (2023.02); *H10B 41/50* (2023.02); *H10B 43/27* (2023.02)

(58) Field of Classification Search
CPC ........ H10B 43/50; H10B 41/27; H10B 41/50; H10B 43/27; H10B 41/10; H10B 43/10; H10B 43/35; H10B 41/35; H10B 51/30; H10B 53/30; G11C 8/14; G11C 16/0483
See application file for complete search history.

(56) References Cited

U.S. PATENT DOCUMENTS

| | | |
|---|---|---|
| 9,478,290 B1 | 10/2016 | Nam et al. |
| 10,529,727 B2 | 1/2020 | Park et al. |
| 10,672,791 B2 | 6/2020 | Lim et al. |
| 10,756,103 B2 | 8/2020 | Lee |
| 10,847,523 B1 | 11/2020 | Yeh et al. |
| 2003/0082901 A1* | 5/2003 | Werner ............. H01L 21/76807 257/E21.585 |

(Continued)

FOREIGN PATENT DOCUMENTS

KR 20210106672 A 8/2021

*Primary Examiner* — Galina G Yushina
(74) *Attorney, Agent, or Firm* — Wolf, Greenfield & Sacks, P.C.

(57) ABSTRACT

A memory device includes a first cell array region and a second cell array region separated by a separation region, each including at least one memory block having a plurality of gate electrode layers stacked in a first direction. The gate electrode layers include an upper select electrode layer including a plurality of string select lines, and a first electrode layer including a plurality of first word lines arranged below the string select lines. The first word lines include a first connection line to connect first end portions of the first word lines positioned on the opposite side of the separation region to each other and a plurality of second connection lines to connect some of second end portions of the plurality of first word lines adjacent to the separation region to each other, wherein each of the second connection lines is shorter than the first connection line.

20 Claims, 21 Drawing Sheets

(56) References Cited

U.S. PATENT DOCUMENTS

| | | | |
|---|---|---|---|
| 2012/0051140 A1* | 3/2012 | Grossman | G11C 16/0483 |
| | | | 365/185.18 |
| 2015/0371925 A1 | 12/2015 | Thimmegowda et al. | |
| 2018/0358102 A1* | 12/2018 | Zhang | G11C 16/3418 |
| 2019/0214403 A1* | 7/2019 | Oike | H10B 43/27 |
| 2019/0371811 A1* | 12/2019 | Oike | H01L 23/528 |
| 2021/0043641 A1* | 2/2021 | Yun | H10B 43/10 |
| 2021/0174887 A1* | 6/2021 | Sanada | G11C 16/0483 |
| 2021/0265388 A1 | 8/2021 | Baek | |

* cited by examiner

10a 133  141  132  131a  142

10a

MEMORY DEVICES

CROSS-REFERENCE TO RELATED APPLICATION(S)

This application claims benefit of priority to Korean Patent Application No. 10-2021-0140082 filed on Oct. 20, 2021, in the Korean Intellectual Property Office, the disclosure of which is incorporated herein by reference in its entirety.

BACKGROUND

The present disclosure relates to memory devices.

Recent memory devices may have high speed along with a high level of integration in order to process a greater amount of data within a shorter amount of time. In order to improve the degree of integration of memory devices and increase storage capacity, the number of channel structures included in each of a plurality of memory blocks included in memory devices may be increased. However, as the number of channel structures including memory cells increases, a size of the memory blocks may increase. When the size of the memory blocks increases, wirings connected to the memory cells may be increased and operation characteristics of the memory devices may deteriorate.

SUMMARY

An aspect of the present disclosure is to provide a memory device having improved integration and improved operations using a word line structure capable of reducing resistance of a word line to which an operating signal is applied.

According to an aspect of the present disclosure, a memory device includes: a first cell array region and a second cell array region each comprising at least one memory block comprising a plurality of gate electrode layers stacked in a first direction perpendicular to an upper surface of a substrate; and a separation region separating the first cell array region and the second cell array region, wherein, in the at least one memory block, the plurality of gate electrode layers comprises an upper select electrode layer comprising a plurality of string select lines extending in a second direction perpendicular to the first direction and spaced apart from each other in a third direction perpendicular to the first direction, and a first electrode layer comprising a plurality of first word lines arranged below the plurality of string select lines, and the plurality of first word lines include a first connection line extending in the third direction to connect first end portions of the plurality of first word lines positioned on the opposite side of the separation region to each other and a plurality of second connection lines extending in the third direction to connect some of second end portions of the plurality of first word lines adjacent to the separation region to each other, the plurality of second connection lines being shorter than the first connection line.

According to another aspect of the present disclosure, a memory device includes: a first cell array region and a second cell array region each comprising at least one memory block comprising a plurality of gate electrode layers stacked in a first direction, perpendicular to an upper surface of a substrate; and a separation region separating the first cell array region and the second cell array region, wherein, in the at least one memory block, the plurality of gate electrode layers comprises: an upper select electrode layer comprising a plurality of string select lines extending in a second direction perpendicular to the first direction and spaced apart from each other in a third direction perpendicular to the first direction; and a first electrode layer comprising a plurality of first word lines arranged below the plurality of string select lines, in which first end portions of the plurality of first word lines, positioned on the opposite side of the separation region, are electrically connected to each other in the third direction, and at least one of second end portions of the plurality of first word lines adjacent to the separation region extends in the second direction to be electrically connected to one or more of the first end portions through an upper metal line crossing an upper portion of the memory block.

According to another aspect of the present disclosure, a memory device comprises: a first cell array region and a second cell array region each comprising at least one memory block comprising a plurality of gate electrode layers stacked in a first direction, perpendicular to an upper surface of a substrate, a plurality of channel structures penetrating through the plurality of gate electrode layers, and a plurality of first separation structures extending in a second direction perpendicular to the first direction, wherein the at least one memory block is spaced apart from each other in the second direction and arranged in a third direction perpendicular to the first direction; and at least one second separation structure extending in the third direction, wherein, in the at least one memory block, the plurality of gate electrode layers comprises an upper select electrode layer comprising a plurality of string select lines extending in the second direction and a first electrode layer comprising a plurality of first word lines below the plurality of string select lines, and at least one of the plurality of word lines forms a parallel connection structure through a separate connection line electrically connected to an end portion adjacent to the separation region.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure will be described with reference to the accompanying drawings.

Figure 1:
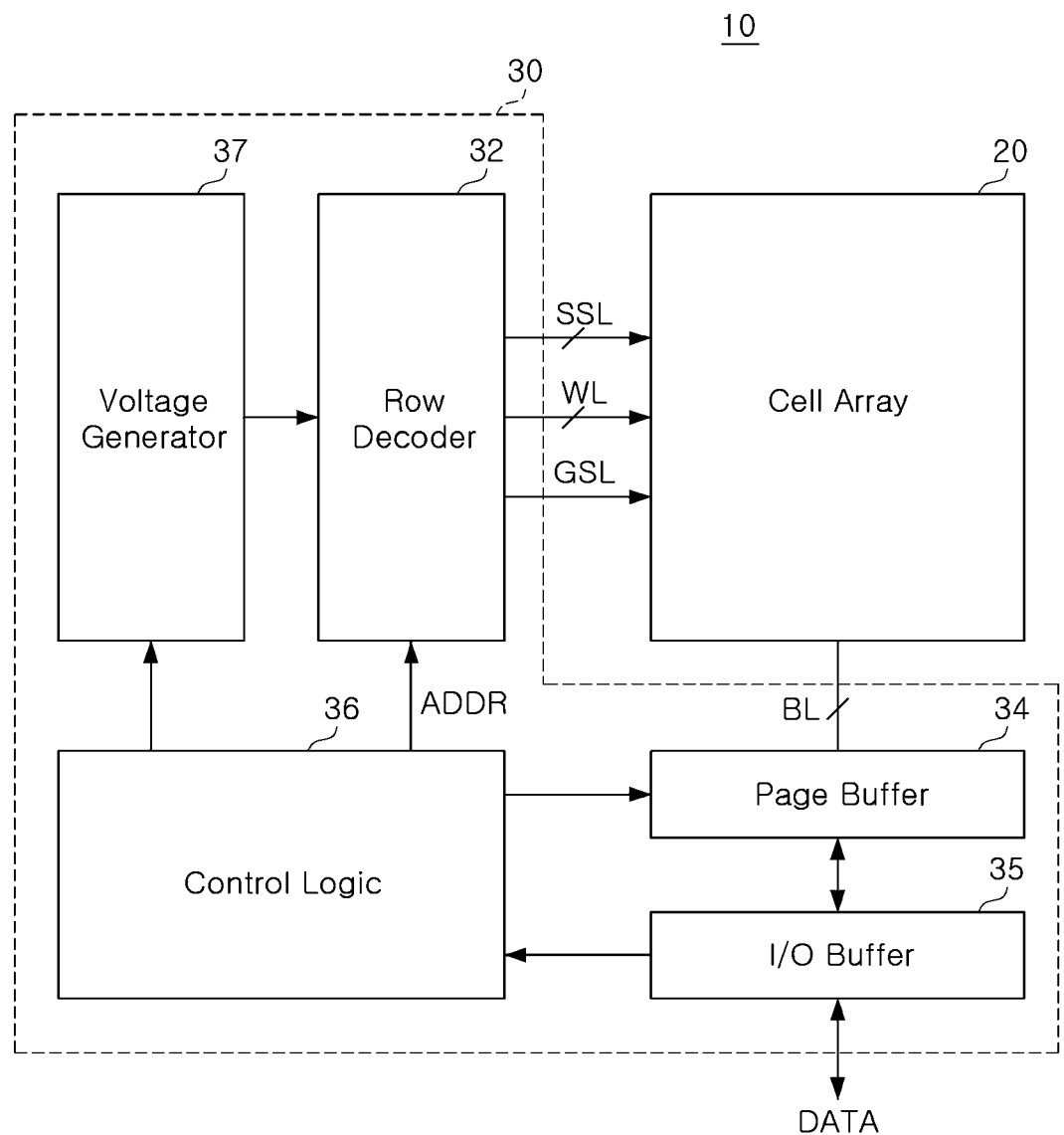
FIG. 1 is a schematic block diagram illustrating a memory device according to an example embodiment of the present disclosure.

FIG. 1 is a schematic block diagram illustrating a memory device according to an embodiment of the present disclosure.

Referring to FIG. 1, a memory device 10 may include a memory cell array 20 and a peripheral circuit 30. The peripheral circuit 30 may include a row decoder 32, a page buffer 34, an input/output (I/O) buffer 35, a control logic 36, and a voltage generator 37.

The memory cell array 20 may include a plurality of memory blocks, and each memory block may include a plurality of memory cells. The plurality of memory cells may be connected to the row decoder 32 through a string select line SSL, word lines WL, and a ground select line GSL, and may be connected to the page buffer 32 through bit lines BL. For example, a plurality of memory cells arranged in the same row may be connected to the same word line WL, and a plurality of memory cells arranged in the same column may be connected to the same bit line BL. As used herein, the term "connected" may mean electrically connected.

The row decoder 32 may decode an input row address ADDR to generate and transmit driving signals of the word line WL. The row decoder 32 may include pass transistors (see, e.g., FIG. 9) operating in response to a control signal applied from the control logic 36. The pass transistors may provide a word line voltage generated by the voltage generator 37 to a selected word line WL and unselected word lines WL, respectively.

The page buffer 34 may be connected to the memory cell array 20 through bit lines BL to read information stored in the memory cells. The page buffer 34 may temporarily store data to be stored in the memory cells or detect data stored in the memory cells according to an operating mode. The page buffer 34 may include a column decoder. For example, the column decoder may selectively activate the bit lines BL of the memory cell array 20.

Meanwhile, the page buffer 34 may operate as a write driver or a sense amplifier according to an operating mode. For example, the page buffer 34 may apply a bit line voltage corresponding to data to be written to a selected bit line when performing a write operation. The page buffer 34 may detect a voltage of a bit line BL selected by the column decoder to read data stored in the selected memory cell, when performing a read operation.

During a program operation, the I/O buffer 35 may receive data DATA and transmit the received data DATA to the page buffer 34, and during a read operation, the I/O buffer 35 may output the data DATA received from the page buffer 34 to an external source. The I/O buffer 35 may transmit an input command and/or an address to the control logic 36.

The control logic 36 may control operations of the row decoder 32 and the page buffer 34. The control logic 36 may receive a command and/or an address transmitted from an external source, and may operate according to a received electrical signal. The control logic 36 may output control signals for controlling read, write, and/or erase operations in response to the electrical signals.

The voltage generator 37 may generate operating voltages necessary for an internal operation, for example, a write voltage, a read voltage, and an erase voltage, using an external voltage. The operating voltage generated by the voltage generator 37 may be transmitted to the memory cell array 20 through the row decoder 32.

Figure 2:
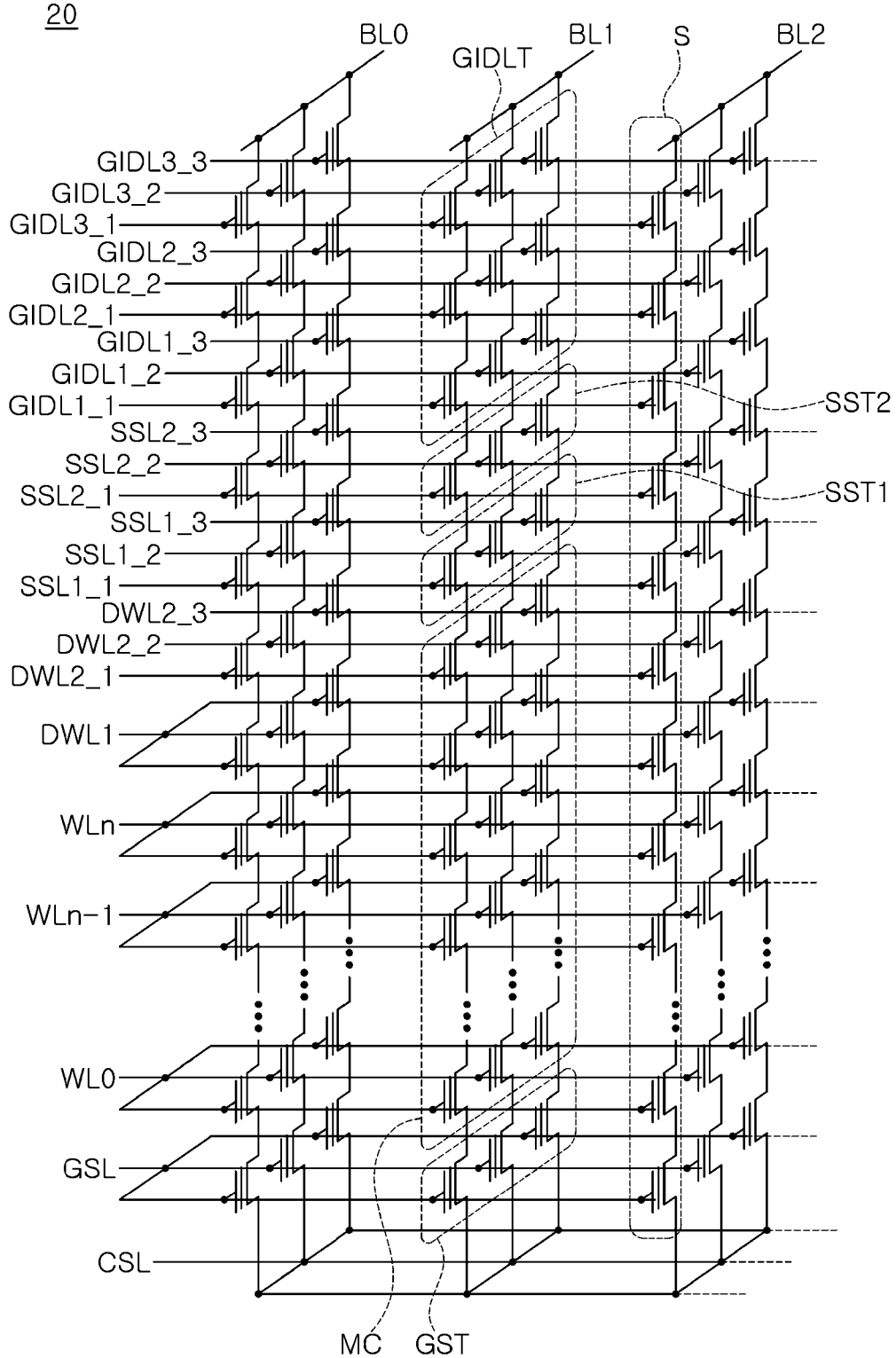
FIG. 2 is an equivalent circuit diagram of a memory block included in a memory device according to an example embodiment of the present disclosure.

FIG. 2 is an equivalent circuit diagram of a memory block included in a memory device according to an embodiment of the present disclosure.

Referring to FIG. 2, the memory cell array 20 may include a plurality of memory cell strings S including memory cells MC connected to each other in series and a ground select transistor GST and string select transistors SST1 and SST2 connected in series at both ends of the memory cells MC.

The memory cells MC adjacent to the string select transistors SST1 and SST2 may be dummy memory cells. Although it is illustrated that the dummy memory cells are arranged in two layers in the memory cell array 20 of FIG. 2, this is only an example and the present disclosure may not be limited to this example.

A GIDL transistor GIDLT may be connected in series to one end of the string select transistors SST1 and SST2. For example, the GIDL transistor GIDLT may be a transistor for using a gate-induced drain leakage current (GIDL current) to supply holes required for an erase operation to a channel in a memory device having a Cell On PERI (peripheral circuit region) (COP) structure.

The plurality of memory cell strings S may be connected to respective bit lines BL0 to BL2 in parallel. The plurality of memory cell strings S may be commonly connected to a common source line CSL. That is, a plurality of memory cell strings S may be between the plurality of bit lines BL0 to BL2 and one common source line CSL. In an example embodiment, a plurality of common source lines CSL may be arranged two-dimensionally.

The memory cells MC connected to each other in series may be controlled by word lines WL0 to WLn, DWL1, DWL2_1, DWL2_2, and DWL2_3 for selecting the memory cells MC. For example, the word lines connected to the gate electrodes of the dummy memory cells may be dummy word lines DWL1, DWL2_1, DWL2_2, and DWL2_3. However, the equivalent circuit diagram of the memory cell array 20 illustrated in FIG. 2 may be only an example embodiment and is not limited thereto, and one or more dummy word lines may be between the lowest word line WL0 and the ground select line GSL.

Each of the memory cells MC may include a data storage element. Gate electrode layers of the memory cells MC at substantially the same distance from the common source line CSL may be commonly connected to one of the word lines WL0 to WLn to be in an equipotential state. Alternatively, even if the gate electrode layers of the memory cells MC are at substantially the same distance from the common source lines CSL, the gate electrode layers in different rows or columns may be controlled independently.

The ground select transistor GST is controlled by the ground select line GSL and may be connected to the common source line CSL. The string select transistors SST1 and SST2 may be controlled by the string select lines SSL1_1, SSL1_2, SSL1_3, SSL2_1, SSL2_2, and SSL2_3, and may be connected to the bit lines BL0 to BL2.

FIG. 2 illustrates a structure in which one ground select transistor GST and two string select transistors SST1 and SST2 are respectively connected to a plurality of memory cells MC connected to each other in series, but each one of the transistors SST1 and SST2 may be connected, or a plurality of ground select transistors GST may be connected to the plurality of memory cells MC.

When a signal is applied to the string select transistors SST1 and SST2 through the string select lines SSL1_1, SSL1_2, SSL1_3, SSL2_1, SSL2_2, and SSL2_3, a signal applied through the bit lines BL0 to BL2 is transmitted to the memory cells MC connected to each other in series, thereby executing a data read and write operation. Also, an erase operation of erasing data written in the memory cells MC may be performed by applying a predetermined erase voltage through a substrate.

GIDL lines GIDL1_1, GIDL1_2, GIDL1_3, GIDL2_1, GIDL2_2, GIDL2_3, GIDL3_1, GIDL3_2, and GIDL3_3 may be connected to a gate electrode of the GIDL transistor GIDLT. During the erase operation, an erase voltage may be applied to the bit lines BL0 to BL2, and a voltage smaller than the erase voltage may be applied to the gate electrode of the GIDL transistor GIDLT.

In this case, a depletion region may be formed in a portion in which the gate electrode and a drain electrode of the GIDL transistor GIDLT overlap each other, and an electron-hole pair may be formed in the depletion region. As electrons among the formed electron-hole pairs move toward the drain region by tunneling, holes may move to a channel region and increase a channel voltage, thereby facilitating the erase operation.

Meanwhile, the memory cell array 20 may include at least one dummy memory cell string electrically isolated from the bit lines BL0 to BL2.

Figure 3:
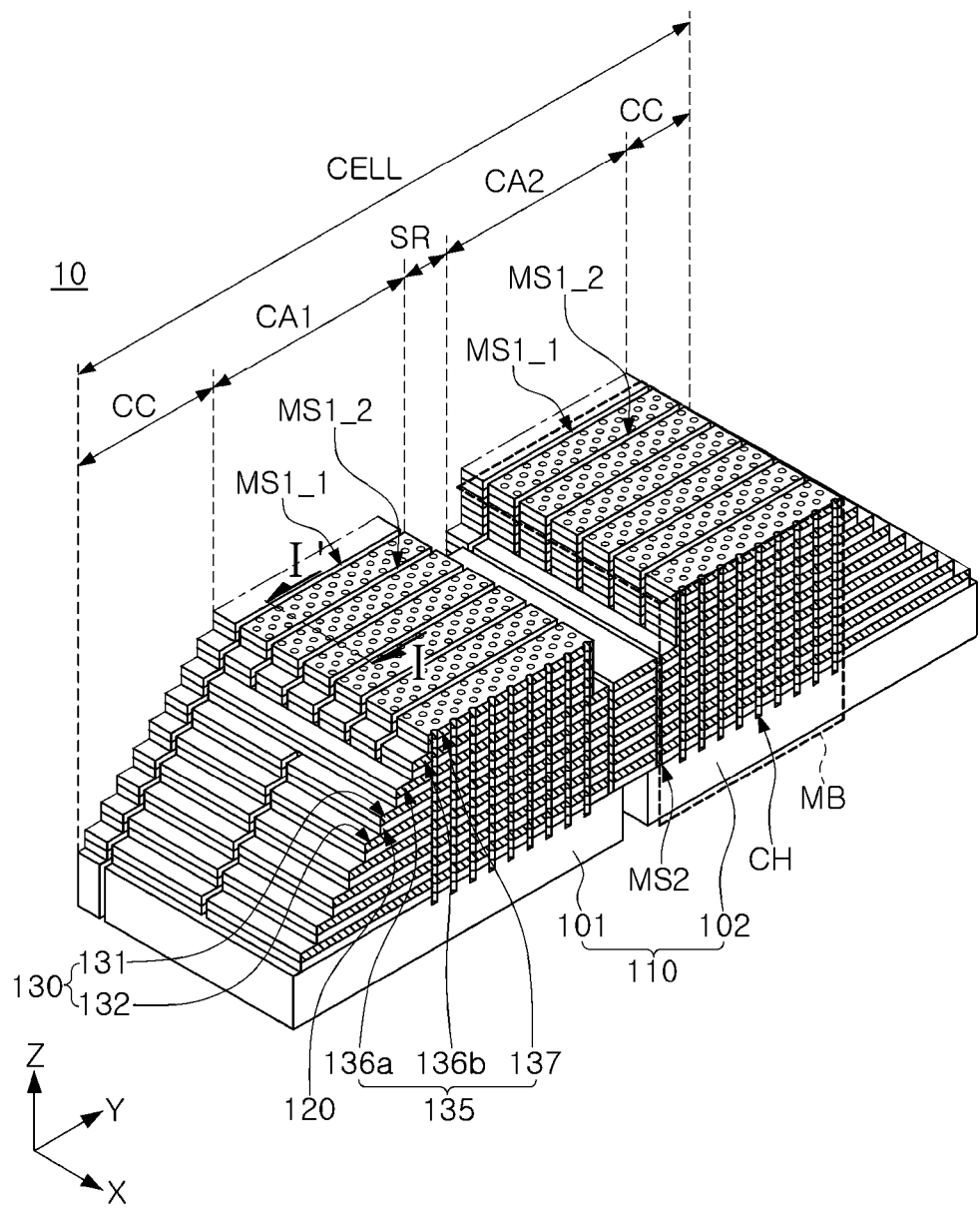
FIG. 3 is a schematic perspective view of a memory device according to an example embodiment of the present disclosure.

FIG. 3 is a schematic perspective view of a memory device according to an embodiment of the present disclosure.

The memory device 10 illustrated in FIG. 3 may show only a memory cell region CELL excluding a peripheral circuit region PERI. The memory device 10 according to an embodiment of the present disclosure may have a cell on PERI (COP) structure. Accordingly, the peripheral circuit region PERI may be below the memory cell region CELL (see, e.g., FIG. 19). However, this is only an example and the present disclosure is not limited thereto, and the memory device 10 may have a structure other than the COP structure.

Referring to FIG. 3, the memory device 10 according to an embodiment of the present disclosure may include a first cell array region CA1, a second cell array region CA2, a separation region SR, and a cell contact region CC formed on a first substrate 110. With respect to orientation when discussing FIG. 3, the Z direction may be referred to as the first direction, the X direction may be referred to as the second direction, and the Y direction may be referred to as the third direction. The first cell array region CA1, the second cell array region CA2, the separation region SR, and the cell contact region CC may have boundaries in a second direction (e.g., an X direction) parallel to an upper surface of the first substrate 110.

The first cell array region CA1 and the second cell array region CA2 may be on a first plate portion 101 and a second plate portion 102 of the first substrate 110, respectively. Each of the first cell array region CA1 and the second cell array region CA2 may include at least one memory block MB, and the memory block MB may include channel structures CH in which a plurality of memory cells are formed.

Each of the first cell array region CA1 and the second cell array region CA2 of the memory device 10 is illustrated as including one memory block MB in FIG. 3, but this is only for convenience of illustration and each of the first cell array region CA1 and the second cell array region CA2 may include a plurality of memory blocks MB arranged in a third direction (e.g., a Y direction).

The memory device 10 according to an embodiment of the present disclosure may include a plurality of gate electrode layers 130 are stacked and spaced apart from each other in a first direction (e.g., a Z direction), perpendicular to the upper surface of the first substrate 110, a semiconductor substrate. For example, interlayer insulating layers 120 may be between the plurality of gate electrode layers 130.

The plurality of channel structures CH may extend in the first direction to penetrate through the plurality of gate electrode layers 130. The plurality of channel structures CH may be spaced apart from each other in the second direction. As an example, the plurality of channel structures CH illustrated in the memory device 10 of FIG. 3 is merely an illustration for convenience, and thousands to tens of thousands of channel structures CH may be in the second direction.

The separation region SR is between the first cell array region CA1 and the second cell array region CA2 in the second direction to separate the first cell array region CA1 and the second cell array region CA2.

The cell contact region CC may be outside the first cell array region CA1 and the second cell array region CA2 in the second direction, and may have a step structure for forming pad structures connected to the gate electrode layers included in the first cell array region CA1 and the second cell array region CA2. However, the structure of the memory device 10 illustrated in FIG. 3 is merely an example embodiment and may not be limited to this example.

In at least one memory block MB included in the memory device 10 according to an embodiment of the present disclosure, the plurality of gate electrode layers 130 may include a second electrode layer 132, a first electrode layer 131, and upper select electrode layers 136a and 136b sequentially stacked in the first direction. Meanwhile, when the memory device 10 has a COP structure, the plurality of gate electrode layers 130 may further include a GIDL electrode layer 137 stacked on the upper select electrode layers 136a and 136b.

The first electrode layer 131 may include a plurality of first word lines extending in the second direction. The second electrode layer 132 may include a plurality of second word lines extending in the second direction. The upper select electrode layers 136a and 136b may include a plurality of string select lines extending in the second direction. The GIDL electrode layer 137 may include a plurality of GIDL lines extending in the second direction. That is, the GIDL electrode layer 137 may include a plurality of GIDL lines above the plurality of string select lines.

For example, some of the plurality of lines included in the plurality of gate electrode layers 130 may be spaced apart from each other by the plurality of first separation structures MS1_1 and MS1_2 extending in the second direction. The cell array regions CA1 and CA2 and the separation region SR may be spaced apart from each other by at least one second separation structure MS2.

During a manufacturing process of the memory device 10 according to an embodiment of the present disclosure, at least some of the plurality of gate electrode layers 130 included in the separation region SR and the cell array regions CA1 and CA2 adjacent to the separation region SR may be removed. For example, the gate electrode layers 135 at an upper side, among the plurality of gate electrode layers 130, may be removed. For example, the upper gate electrode layers 135 may include upper select electrode layers 136a and 136b including a plurality of string select lines.

Accordingly, a plurality of first word lines may be on the uppermost layer among the plurality of gate electrode layers 130 in the separation region SR. In the memory device 10 according to an embodiment of the present disclosure, at least one of the end portions of the plurality of first word lines adjacent to the separation region SR may form a parallel connection structure through a separate connection line.

Resistance of the plurality of first word lines may vary according to a connection relationship of the plurality of first word lines. The operation of the memory device 10 may be performed by an electrical signal applied through the plurality of gate electrode layers 130 respectively connected to the channel structures CH as paths. Accordingly, a magnitude of the resistance of the plurality of first word lines may affect the operation of the memory device 10.

For example, at least one of end portions of the plurality of first word lines adjacent to the separation region SR may be electrically connected to other portions of the plurality of first word lines in the third direction. Alternatively, at least one of the end portions of the plurality of first word lines adjacent to the separation region SR may be electrically connected to the opposite end portion through an upper metal line extending in the second direction from the upper portions of the cell array regions CA1 and CA2. However, this is only an example and the present disclosure is not limited thereto, and a connection relationship of the plurality of first word lines may vary according to an embodiment.

Figure 4:
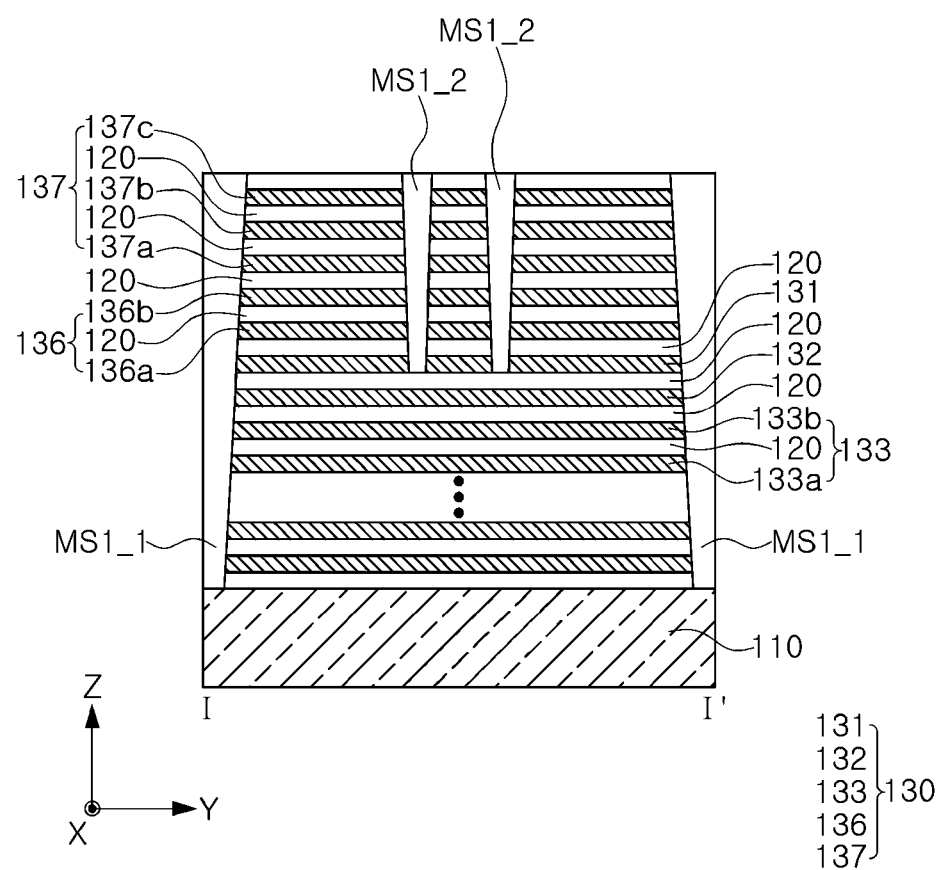
FIG. 4 is a view illustrating separation structures of a memory device according to an example embodiment of the present disclosure.

FIG. 4 is a view illustrating separation structures of a memory device according to an embodiment of the present disclosure.

FIG. 4 may be a cross-section taken along line I-I' in the memory device 10 illustrated in FIG. 3. Referring to FIG. 4, in the cell array regions CA1 and CA2 of the memory device 10 according to an embodiment of the present disclosure, a plurality of gate electrode layers 130 and interlayer insulating layers 120 may be alternately stacked on the first substrate 110.

The plurality of gate electrode layers 130 may include a second electrode layer 132, a first electrode layer 131, and an upper select electrode layer 136 sequentially stacked in the first direction. The plurality of gate electrodes may further include a plurality of third electrode layers 133a, 133b (together referred to as 133) respectively including a plurality of third word lines below the second electrode layer 132. As used herein, when the term Element A is "below" Element B is used, it may refer to the situation where Element A is closer to a reference plane in a particular direction than Element B. Likewise, when the term Element A is "above" Element B is used, it may refer to the situation where Element A is further away from a reference plane in a particular direction than Element B. The upper select electrode layer 136 may include a plurality of stacked upper select electrode layers 136a and 136b.

When the memory device 10 has a COP structure, the plurality of gate electrode layers 130 may further include GIDL electrode layers 137a, 137b, 137c (together referred to as 137) including a plurality of GIDL lines on the upper select electrode layer 136. That is, the GIDL electrode layer 137 may include a plurality of GIDL lines above the plurality of string select lines in the upper select electrode layer 136.

In an embodiment, the plurality of first word lines included in the first electrode layer 131 and the plurality of second word lines included in the second electrode layer 132 may be dummy word lines, and the plurality of third word lines respectively included in the plurality of third electrode layers 133 may be operating word lines.

Meanwhile, the plurality of gate electrode layers 130 and the interlayer insulating layers 120 may be penetrated by the plurality of first separation structures MS1_1 and MS1_2 extending in the first direction. For example, the plurality of first separation structures MS1_1 and MS1_2 may include a plurality of word line separation structures MS1_1 and a plurality of select line separation structures MS1_2.

The cross-sectional view illustrated in FIG. 4 does not include channel structures, but the channel structures are only omitted for convenience, and the channel structures extending in the first direction may be formed between the plurality of first separation structures MS1_1 and MS1_2.

In the first direction, the plurality of word line separation structures MS1_1 may extend to penetrate through the plurality of gate electrode layers 130. The plurality of select line separation structures MS1_2 may extend to overlap the first electrode layer 131 in the third direction. As used herein, when element A is said to "overlap" or is "overlapping" element B, it may refer to the situation where element A is said to extend over or past, and cover a part of, element B in a given direction. Note that element A may overlap element B in a first direction, but may or may not overlap element B in a second direction. Meanwhile, referring to FIG. 3 together, at least one second separation structure MS2 separating the separation region SR from the cell array regions CA1 and CA2 may extend to penetrate through the plurality of gate electrode layers 130, similar to the plurality of word line separation structures MS1_1.

Figure 5:
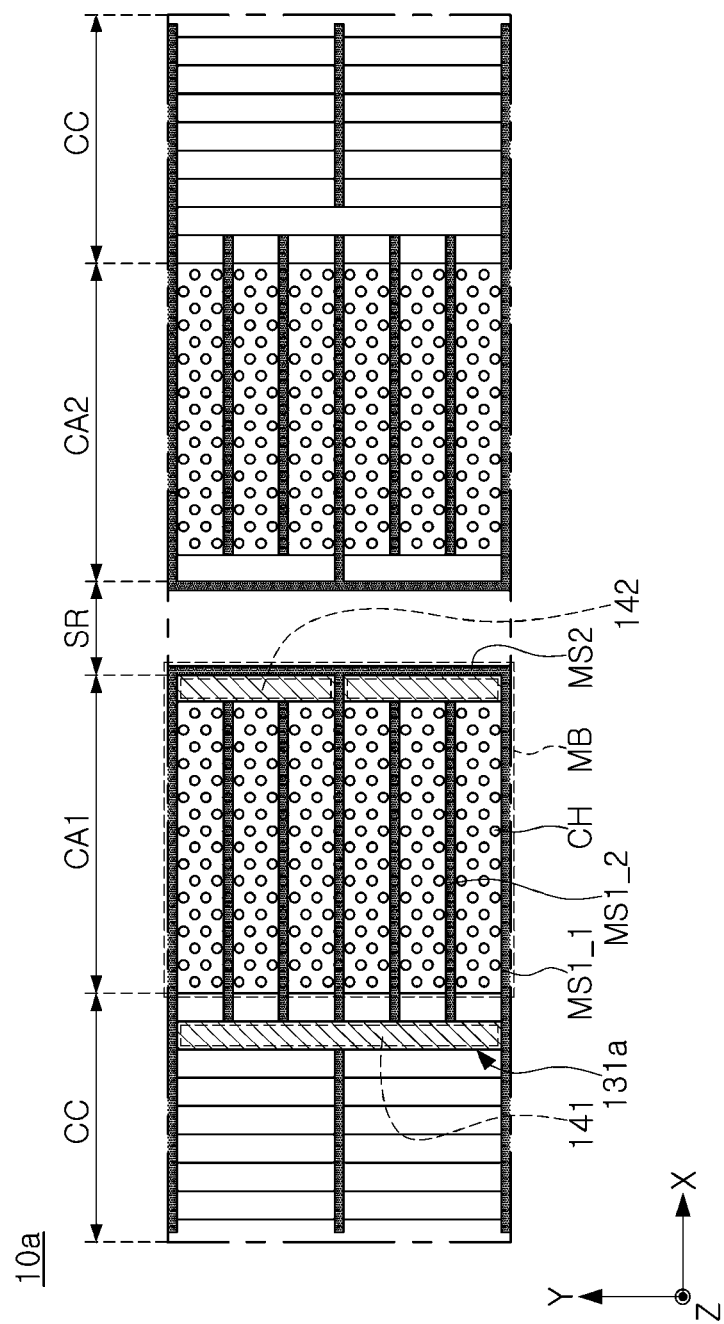
FIG. 5 is a top view illustrating a structure of a memory device according to an example embodiment of the present disclosure.

FIG. 5 is a top view illustrating a structure of a memory device according to an embodiment of the present disclosure.

Referring to FIG. 5, a memory device 10a according to an embodiment of the present disclosure may be divided into the cell array regions CA1 and CA2, the separation region SR, and the cell contact region CC in the second direction (e.g., the X direction).

The cell array regions CA1 and CA2 may include a plurality of channel structures CH penetrating through a plurality of gate electrode layers stacked in the first direction (e.g., the Z direction) perpendicular to the upper surface of the substrate, and a plurality of first separation structures MS1_1 and MS1_2 extending in the second direction.

The separation region SR may include at least one second separation structure MS2 extending in the third direction (e.g., a Y direction). Since the second separation structures MS2 serve as a reference for distinguishing the separation region SR from the cell array regions CA1 and CA2, the number and spacing of the second separation structures MS2 may determine a size of the separation region SR.

The first cell array region CA1 of the memory device 10a illustrated in FIG. 5 may correspond to one memory block MB. One memory block MB may include three word line separation structures MS1_1 extending in the second direction and two select line separation structures MS1_2 arranged between the word line separation structures MS1_1.

In other words, one word line separation structure MS1_1 and two select line separation structures MS1_2 may alternate with each other in the third direction. Meanwhile, seven channel structures CH may be between two adjacent word line separation structures MS1_1 among the plurality of word line separation structures MS1_1. However, this is only an example and the present disclosure may not be limited to this example. For example, there may be only three or more channel structures CH between the two adjacent word line separation structures MS1_1 among the plurality of word line separation structures MS1_1.

In one memory block MB, the plurality of select line separation structures MS1_2 may not separate the plurality of first word lines at both (opposite) end portions of the first electrode layer 131a from each other. Meanwhile, the word line separation structure MS1_1 in the center of the memory block MB may separate the plurality of first word lines at the end portion of the first electrode layer 131a adjacent to the separation region SR from each other and may not separate the plurality of first word lines at the end portion of the first electrode layer 131a adjacent to the cell contact region CC from each other.

Accordingly, the plurality of first word lines may be electrically connected to each other by a first connection line 141 extending in the third direction from the end portion adjacent to the cell contact region CC, and some of the plurality of first word lines may be electrically connected to each other by a plurality of second connection lines 142 extending in the third direction from the end portion adjacent to the separation region SR. In this case, in the third direction, a length of each of the plurality of second connection lines 142 may be shorter than that of the first connection line 141. That is, in the plurality of first word lines, at least one of end portions adjacent to the separation region SR may be electrically connected to another portion of the plurality of first word lines in the third direction.

Figure 6:
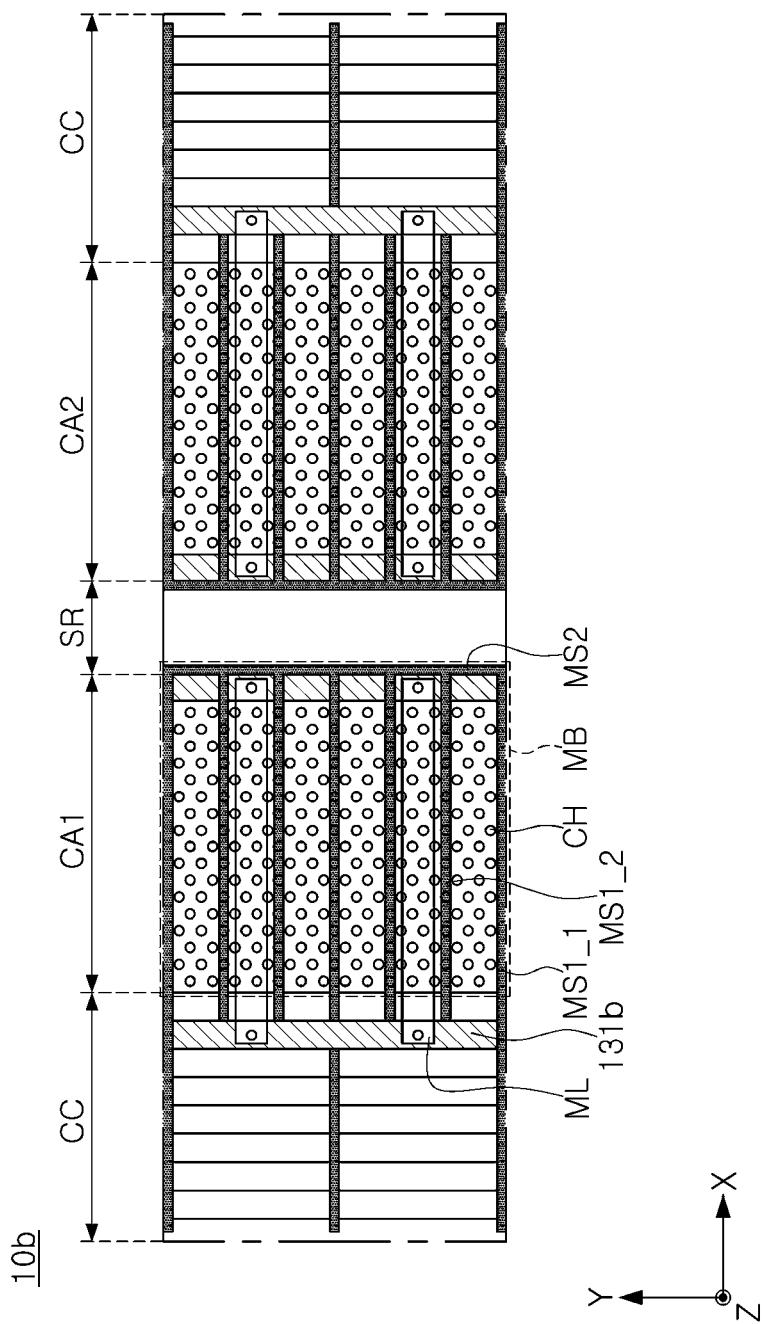
FIG. 6 is a top view illustrating a structure of a memory device according to another example embodiment of the present disclosure.

FIG. 6 is a top view illustrating a structure of a memory device according to another embodiment of the present disclosure.

Referring to FIG. 6, a memory device 10b according to an embodiment of the present disclosure may be divided into the cell array regions CA1 and CA2, the separation region SR, and the cell contact region CC.

The cell array regions CA1 and CA2 may include a plurality of channel structures CH penetrating through a plurality of gate electrode layers stacked in the first direction (e.g., the Z direction) perpendicular to the upper surface of the substrate, and a plurality of first separation structures MS1_1 and MS1_2 extending in the second direction.

The separation region SR may include at least one second separation structure MS2 extending in the third direction (e.g., the Y direction). Since the second separation structures MS2 serve as a reference for distinguishing the separation region SR from the cell array regions CA1 and CA2, the number and spacing of the second separation structures MS2 may determine a size of the separation region SR.

The first cell array region CA1 of the memory device 10b illustrated in FIG. 6 may correspond to one memory block MB. One memory block MB may include three word line separation structures MS1_1 extending in the second direction and two select line separation structures MS1_2 arranged between the word line separation structures MS1_1.

In other words, one word line separation structure MS1_1 and two select line separation structures MS1_2 may alternate with each other in the third direction. Meanwhile, seven channel structures CH may be between two adjacent word line separation structures MS1_1 among the plurality of word line separation structures MS1_1.

In one memory block MB, the plurality of select line separation structures MS1_2 and the word line separation structure MS1_1 in the middle of the memory block MB may separate the plurality of first word lines at the end portion of the first electrode layer 131a adjacent to the separation region SR from each other, and may not separate the plurality of first word lines at the end portion of the first electrode layer 131a adjacent to the cell contact region CC from each other.

Accordingly, in the third direction, the end portions of the plurality of first word lines adjacent to the cell contact region CC may be electrically connected to each other, and the end portions of the plurality of first word lines adjacent to the separation region SR may be separated from each other.

In the memory device 10 according to an embodiment of the present disclosure, at least one end portion of the plurality of first word lines adjacent to the separation region SR may extend in the second direction to be electrically connected to end portions adjacent to the cell contact region CC through the upper metal line ML crossing an upper portion of the memory block MB.

According to an embodiment, the upper metal line ML may extend to cross upper portions of the plurality of bit lines extending in the third direction from the upper portion of the memory block MB in the second direction. The upper metal line ML may be formed of a material different from that of the plurality of first word lines.

Figure 7:
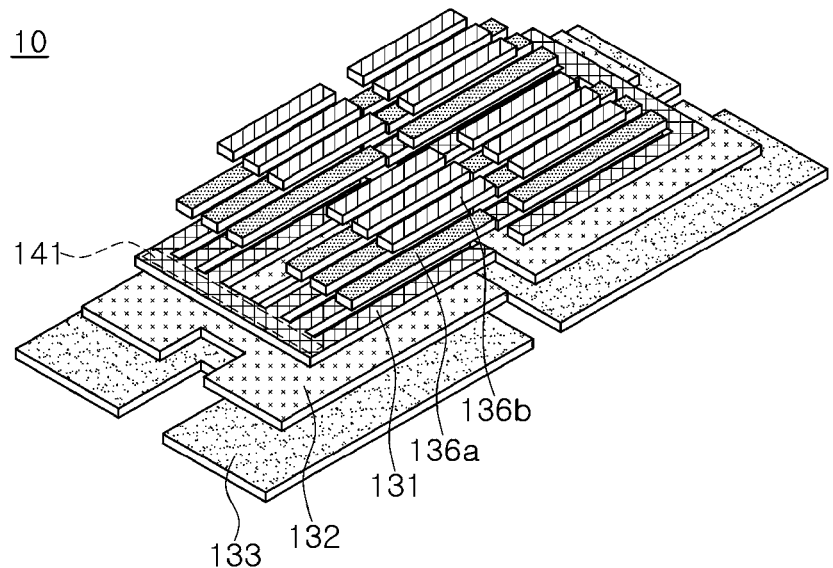
FIGS. 7, 8, and 9 are diagrams illustrating a problem of a memory device including a separation region.
Figure 8:
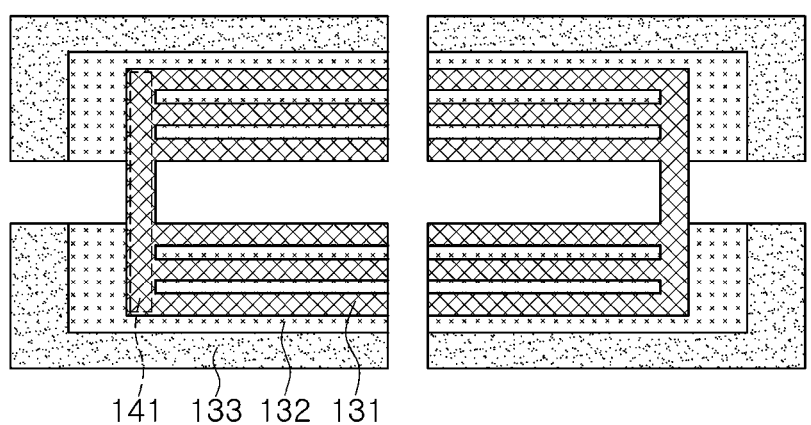
Figure 9:
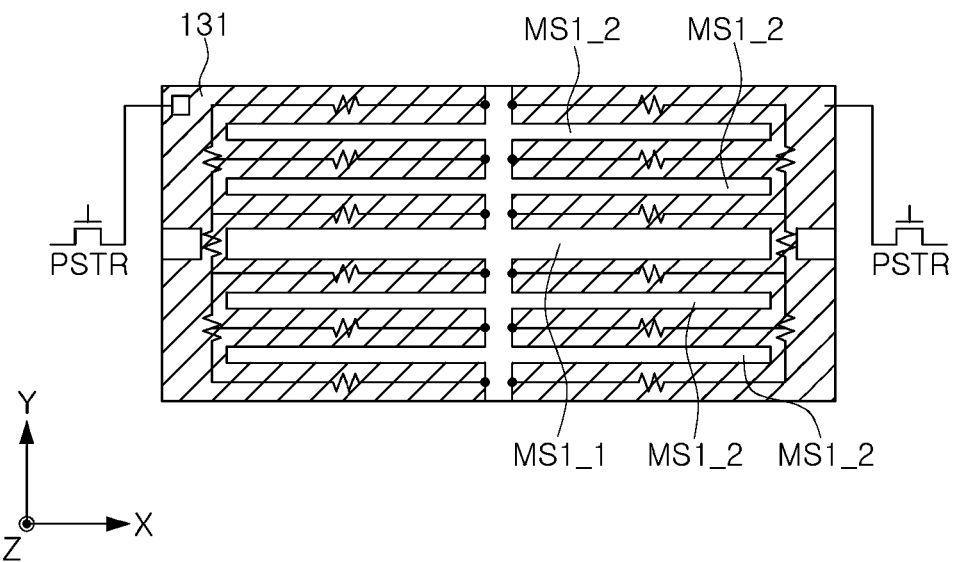

FIGS. 7, 8, and 9 are diagrams illustrating a problem of a memory device including a separation region.

The memory device 10 may perform any one of a read operation, a program operation, and an erase operation based on an externally applied control signal. It may take a predetermined time to perform each operation. The memory device 10 according to an embodiment of the present disclosure may perform recovery between operations in order to supplement low voltage characteristics and protect an operating circuit.

Meanwhile, in order to improve the degree of integration of the memory device 10, the number of channel structures arranged in the third direction in one memory block tends to increase in recent years. An increase in the number of channel structures included in one memory block may cause a problem in that a process is not normally performed in the channel structures disposed between the select line separation structures.

Also, when a size of the cell array region increases, wirings connected to the memory cells implemented by the channel structures may be lengthened, and a time required for charging and/or discharging the memory cells may increase. In other words, a time required for data reading and/or program operation may increase.

In order to solve the above problem, a method of dividing the memory device 10 into two cell array regions in the second direction may be used. For example, each of the divided cell array regions may include a plurality of memory blocks arranged in the third direction.

Referring to FIGS. 7 and 8, the memory device 10 may include a third electrode layer 133, a second electrode layer 132, a first electrode layer 131, and a plurality of upper select electrode layers 136a and 136b that are sequentially stacked. In FIGS. 7 and 8, the memory device 10 may also include a first connection line 141.

The cell array region of the memory device 10 may be divided into two regions by the second separation structure MS2 extending in the third direction (e.g., the Y direction) (see, e.g., FIGS. 3, 5, and 6). Accordingly, the first electrode layer 131 may include first end portions connected to each other in a portion adjacent to the cell contact region CC and second end portions separated from each other in a portion adjacent to the separation region SR.

Referring to FIG. 9, an operating voltage for the memory block to perform an operation may be applied to the first electrode layer 131. Since the cell array region is divided into two regions by the second separation structure MS2, a pass transistor PSTR may be connected to each memory block.

Meanwhile, the operation of the memory device 10 may be related to a magnitude of resistance of the plurality of first word lines included in the first electrode layer 131. For example, when the magnitude of resistance of the plurality of first word lines included in the first electrode layer 131 is large, operating characteristics of the memory device 10 may deteriorate.

For example, the plurality of first word lines included in the first electrode layers 131 illustrated in FIG. 9 may be separated by the second separation structure MS2 (see, e.g., FIGS. 3, 5, and 6). Resistance of the first word line between the select line separation structure MS1_2, among the plurality of first word lines, may significantly increase. Accordingly, the operating performance of the memory device 10 may be deteriorated.

Figure 10:
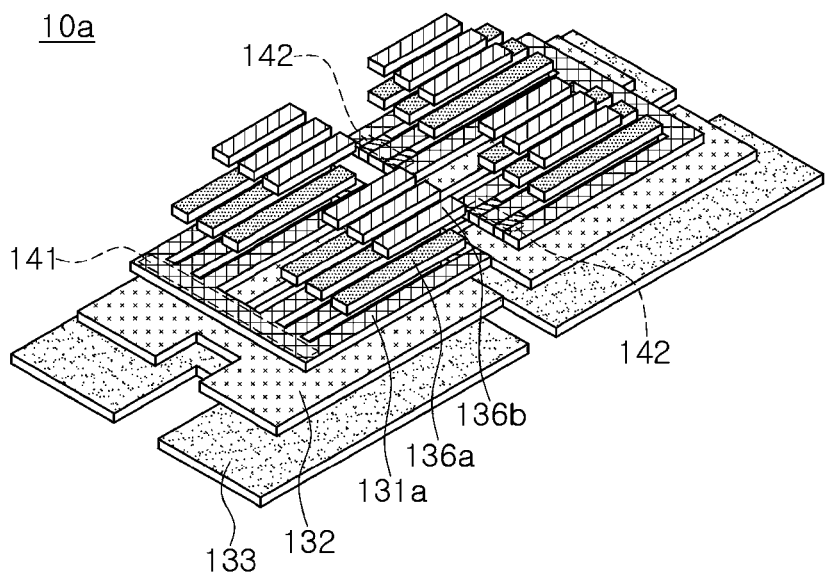
FIGS. 10, 11, and 12 are diagrams illustrating a structure of a memory device according to an example embodiment of the present disclosure.
Figure 11:
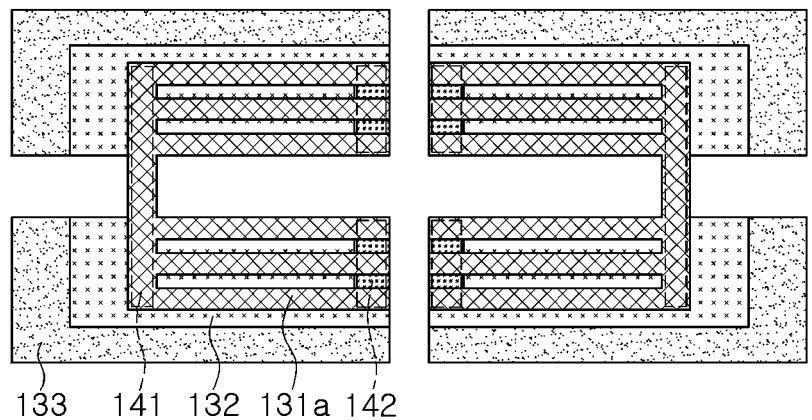
Figure 12:
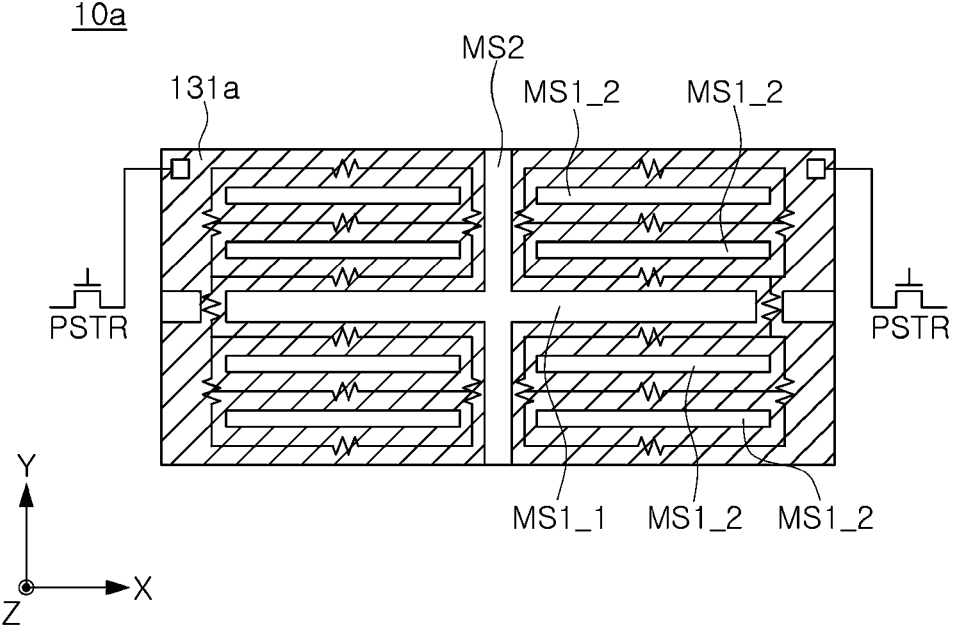

FIGS. 10, 11, and 12 are diagrams illustrating a structure of a memory device according to an embodiment of the present disclosure.

Referring to FIGS. 10 and 11, the memory device 10a according to an embodiment of the present disclosure may include a third electrode layer 133, a second electrode layer 132, a first electrode layer 131a, and a plurality of upper select electrode layers 136a and 136b being sequentially stacked.

The cell array region of the memory device 10a may be divided into two regions by the second separation structure MS2 extending in the third direction (e.g., the Y direction) (see, e.g., FIGS. 3, 5, and 6). Accordingly, the first electrode layer 131a may include a plurality of first word lines, and each of the plurality of first word lines may include first end portions electrically connected to each other in a portion adjacent to the cell contact region CC and second end portions separated from each other in a portion adjacent to the separation region SR. For example, a line connecting the first end portions of the plurality of first word lines in a portion adjacent to the cell contact region CC may be defined as a first connection line 141.

The first electrode layer 131a of the memory device 10a according to an example embodiment may include a plurality of second connection lines 142 connecting some of the second end portions separated from each other in a portion adjacent to the separation region SR. The plurality of second connection lines 142 may extend in the third direction and may be shorter than the first connection line 141. For example, the second connection lines 142 may be on the plurality of second word lines included in the second electrode layer 132 and connect the first end portions of a plurality of first word lines corresponding to the plurality of second word lines, respectively.

Meanwhile, in the memory device 10a according to an embodiment of the present disclosure, the plurality of gate electrode layers included in one memory block may include upper select electrode layers 136a and 136b including a plurality of string select lines extending in the second direction and spaced apart from each other in the third direction.

The plurality of gate electrode layers may include a second electrode layer 132 including a plurality of second word lines disposed below the plurality of first word lines. The plurality of second word lines may have a first width in the third direction corresponding to a length of the first connection line 141 opposite to the separation region SR. In one example embodiment, the first width in the third direction of the second word lines may overlap the length of the first connection line 141 opposite to the separation region SR. In another example embodiment, the first width in the third direction of the second word lines may be the same as the length of the first connection line 141 opposite to the separation region SR. Also, the plurality of second word lines may have a second width in the third direction corresponding to a width of each of the plurality of second connection lines 142 in a portion adjacent to the separation region SR. In one example embodiment, the second width in the third direction of the second word lines may overlap the width of each of the plurality of second connection lines 142 in a portion adjacent to the separation region SR. In another example embodiment, the second width in the third direction of the second word lines may be the same as the width of each of the plurality of second connection lines 142 in a portion adjacent to the separation region SR.

In the memory device 10a illustrated in FIGS. 10 to 12, the plurality of gate electrode layers may include a plurality of second word lines below the plurality of first word lines, wherein the number of second word lines is a natural number n. In this case, the number of each of the plurality of first word lines and the plurality of string select lines may be 3n.

However, this is only an example and the present disclosure may not be limited. For example, when the number of channel structures arranged in one memory block in the third direction increases, the number of first word lines and string select lines corresponding to the n second word lines may vary. However, even in this case, technical features according to embodiments of the present disclosure may be applied.

Referring to FIG. 12, an operating voltage for the memory block to perform an operation may be applied to the first electrode layer 131a. Since the cell array region is divided into two regions by the second separation structure MS2, the pass transistor PSTR may be connected to each memory block.

Meanwhile, the operation of the memory device 10a may be related to a magnitude of resistance of the plurality of first word lines included in the first electrode layer 131a. A plurality of first word lines included in the first electrode layers 131a may be separated by the second separation structure MS2. However, second end portions separated from each other in a portion adjacent to the separation region SR, among the plurality of first word lines, may be electrically connected to each other by the plurality of second connection lines 142.

For example, the memory device 10a according to an embodiment of the present disclosure may significantly reduce resistance of the first word lines included in the first electrode layer 131a. Accordingly, deterioration in operating performance that may occur may be prevented, while reducing the size of the memory device 10a.

Figure 13:
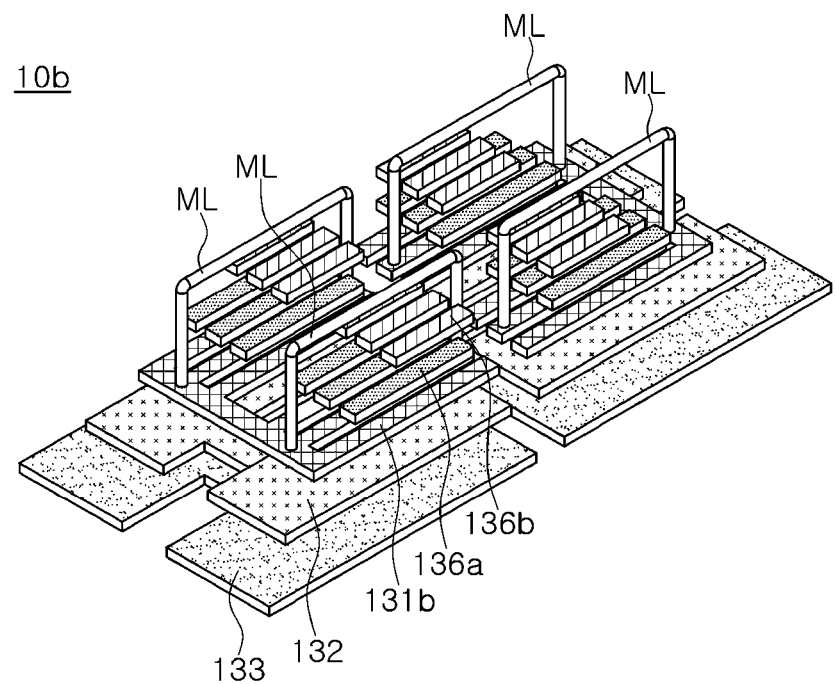
FIGS. 13, 14, and 15 are diagrams illustrating a structure of a memory device according to another example embodiment of the present disclosure.
Figure 14:
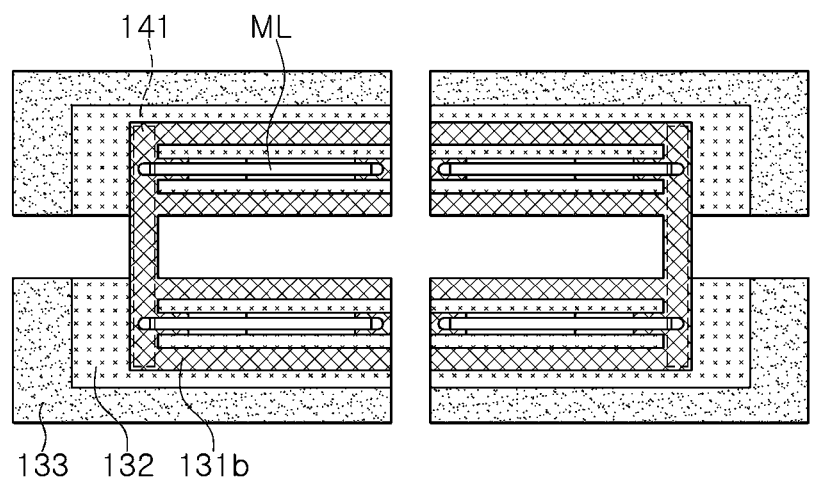
Figure 15:
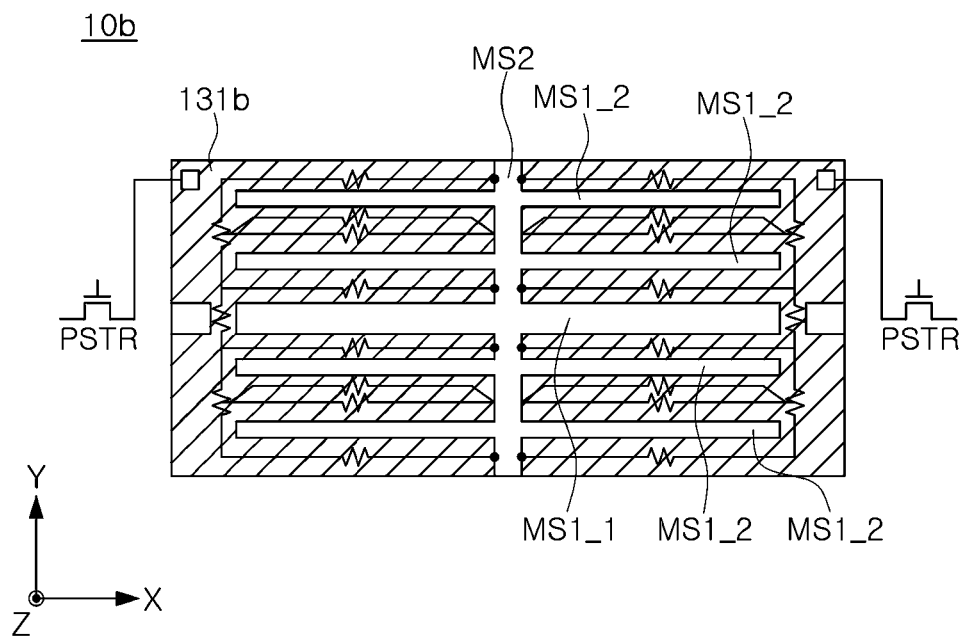

FIGS. 13, 14, and 15 are diagrams illustrating a structure of a memory device according to another embodiment of the present disclosure.

Referring to FIGS. 13 and 14, the memory device 10b according to an embodiment of the present disclosure may include a third electrode layer 133, a second electrode layer 132, a first electrode layer 131b, and a plurality of upper select electrode layers 136a and 136b being sequentially stacked.

The cell array region of the memory device 10b may be divided into two regions by the second separation structure MS2 extending in the third direction (e.g., the Y direction) (see, e.g., FIGS. 3, 5, and 6). Accordingly, the first electrode layer 131b may include first end portions electrically connected to each other in a portion adjacent to the cell contact region CC and second end portions separated from each other in a portion adjacent to the separation region SR. For example, a line connecting the first end portions of the plurality of first word lines in a portion adjacent to the cell contact region CC may be defined as a first connection line 141.

However, the first electrode layer 131b of the memory device 10b according to an embodiment of the present disclosure may include an upper metal line ML electrically connected to at least one of the second end portions separated from each other in a portion adjacent to the separation region SR.

The upper metal line ML may extend in the second direction to cross an upper portion of the memory block. For example, the upper metal line ML may extend to cross upper portions of the plurality of bit lines extending in the third direction. The upper metal line ML may connect at least one of the second end portions to the first end portions electrically connected to each other in a portion adjacent to the cell contact region CC.

Meanwhile, in the memory device 10b according to an embodiment of the present disclosure, the upper select electrode layers 136a and 136b and the second electrode layer 132 included in the plurality of gate electrode layers included in one memory block may correspond to the memory device 10a illustrated in FIGS. 10 to 12.

Referring to FIG. 15, an operating voltage for the memory block to perform an operation may be applied to the first electrode layer 131b. Since the cell array region is divided into two regions by the second separation structure MS2, the pass transistor PSTR may be connected to each memory block.

Meanwhile, the operation of the memory device 10b may be related to a magnitude of resistance of the plurality of first word lines included in the first electrode layer 131b. A plurality of first word lines included in the first electrode layers 131b may be separated by the second separation structure MS2. However, at least one of the second end portions separated from each other in a portion adjacent to the separation region SR, among the plurality of first word lines, may be electrically connected to the first end portions by the upper metal line ML to form a parallel connection structure.

For example, the memory device 10b according to an embodiment of the present disclosure may significantly reduce resistance of the plurality of first word lines included in the first electrode layer 131b. Accordingly, deterioration in operating performance that may occur may be prevented, while reducing the size of the memory device 10b.

Figure 16:
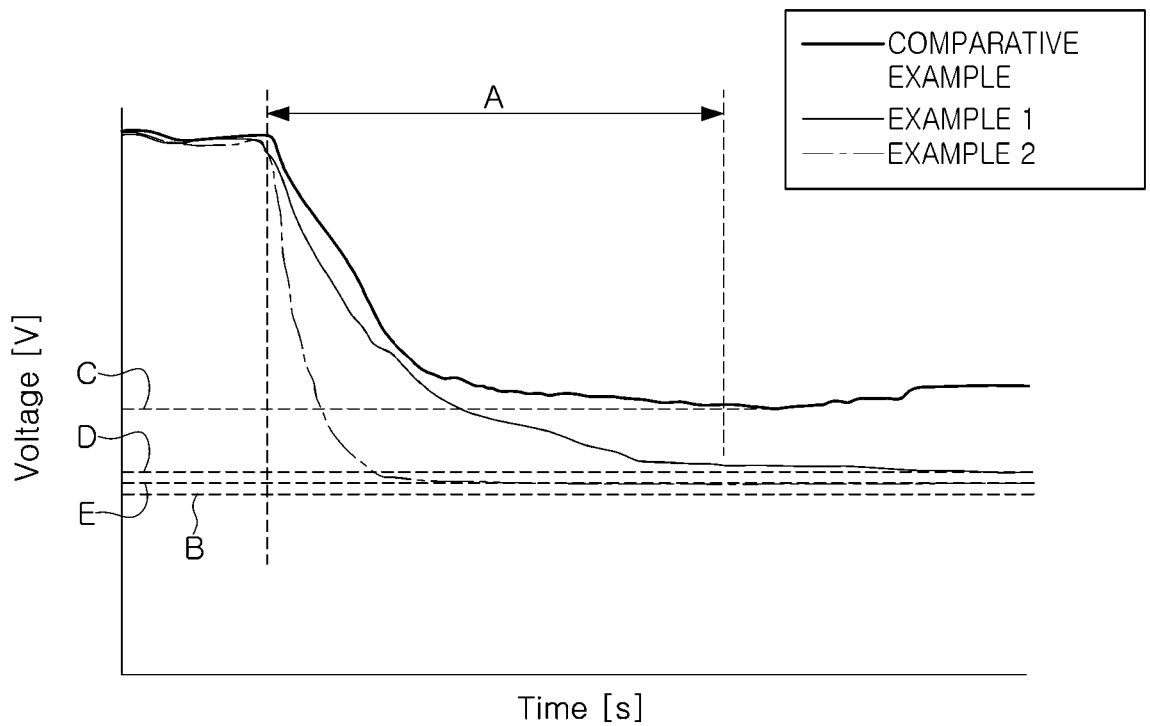
FIG. 16 is a diagram illustrating an effect of a memory device according to an example embodiment of the present disclosure.

FIG. 16 is a diagram illustrating an effect of a memory device according to an embodiment of the present disclosure.

Referring to FIG. 16, Comparative Example may indicate recovery performance of the memory device 10 illustrated in FIGS. 7 to 9. Example 1 may show recovery performance of the memory device 10a illustrated in FIGS. 10 to 12. Example 2 may show recovery performance of the memory device 10b illustrated in FIGS. 13 to 15.

For example, in the recovery operation of the memory devices 10, 10a, and 10b, it may be ideal to perform a voltage drop to a target voltage within a target time. For example, the target time of the memory devices 10, 10a, and 10b may be A[sec], and the target voltage may be B[V]. The target time A and the target voltage B may vary according to embodiments.

However, according to Comparative Example, the recovery operation may not be normally performed within the target time A, and a voltage after the recovery operation may be C[V] greater than the magnitude of the target voltage B. That is, when the structure of the plurality of first word lines is not changed as in the first electrode layer 131, the resistance of the plurality of first word lines is very large, so that the recovery operation performance of the memory device 10 may be deteriorated.

According to Example 1, the recovery operation may be normally performed within the target time, and a voltage after the recovery operation may converge to a first voltage D smaller than a voltage C after the recovery operation is performed in the memory device 10 according to Comparative Example. Meanwhile, according to Example 2, the recovery operation may be normally performed faster than Example 1, and the voltage after performing the recovery operation may also converge to a second voltage E smaller than the first voltage D. That is, when the magnitude of resistance of the plurality of first word lines is reduced by structurally changing the connection relationship of the plurality of first word lines included in the first electrode layers 131a and 131b, deterioration of the recovery operation performance of the memory devices 10a and 10b may be prevented.

Figure 17:
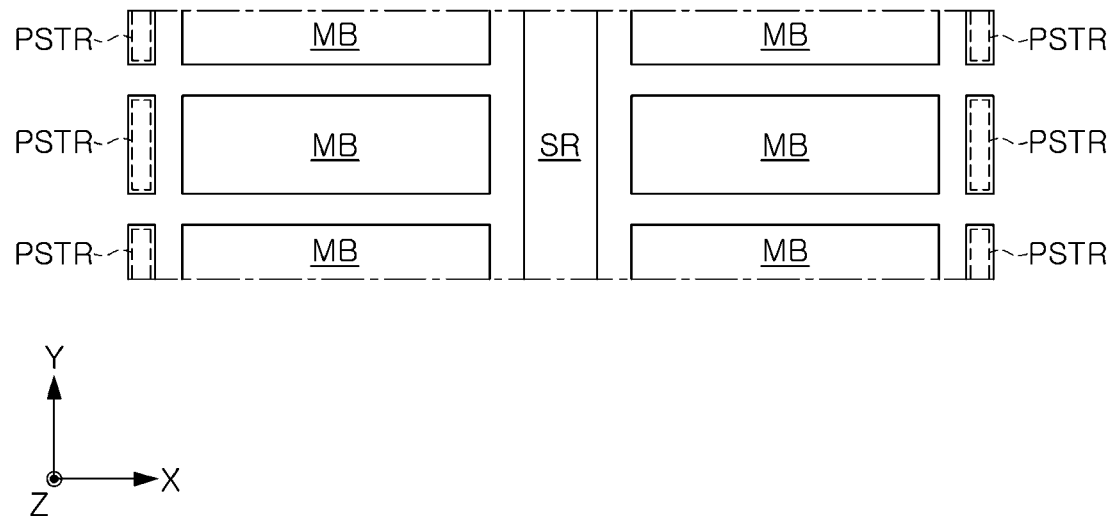
FIGS. 17 and 18 are diagrams illustrating an arrangement of pass transistors included in a memory device according to example embodiments of the present disclosure.
Figure 18:
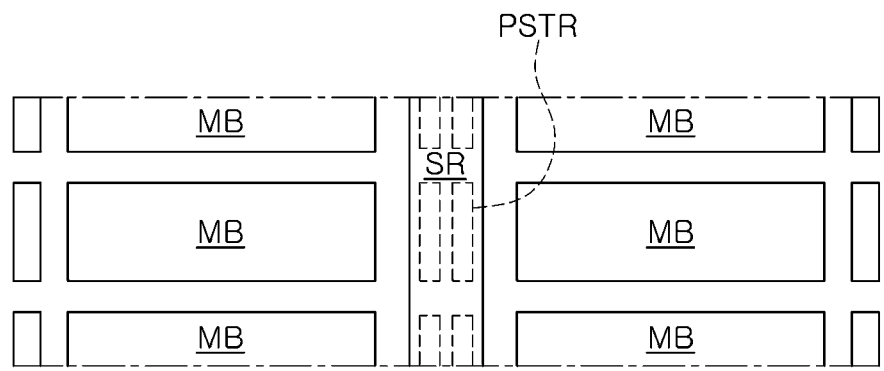

FIGS. 17 and 18 are diagrams illustrating an arrangement of pass transistors included in a memory device according to embodiments of the present disclosure.

The memory devices 10a and 10b according to an embodiment of the present disclosure may have a COP structure. Accordingly, the peripheral circuit region PERI may include a lower substrate and a plurality of transistors and wirings formed on the lower substrate.

For example, the peripheral circuit region PERI (see FIG. 19) may include a row decoder necessary for the operation of the memory devices 10a and 10b. For example, the row decoder may include a pass transistor for applying an operating voltage to the memory block based on external power applied from an external source.

Referring to FIG. 17, the memory devices 10a and 10b according to an embodiment may include pass transistors PSTR formed in the peripheral circuit region PERI corresponding to the cell contact region CC. For example, a pass transistor PSTR for applying an operating voltage to each of the plurality of memory blocks MB may be formed below the plurality of gate electrode layers extending from the cell array regions CA1 and CA2.

Referring to FIG. 18, the memory devices 10a and 10b according to an example embodiment may include the separation region SR between the cell array regions CA1 and CA2, thereby additionally securing a space in which the pass transistors PSTR are formed. Accordingly, the memory devices 10*a* and 10*b* may include pass transistors PSTR formed in the peripheral circuit region PERI corresponding to the separation region SR.

Figure 19:
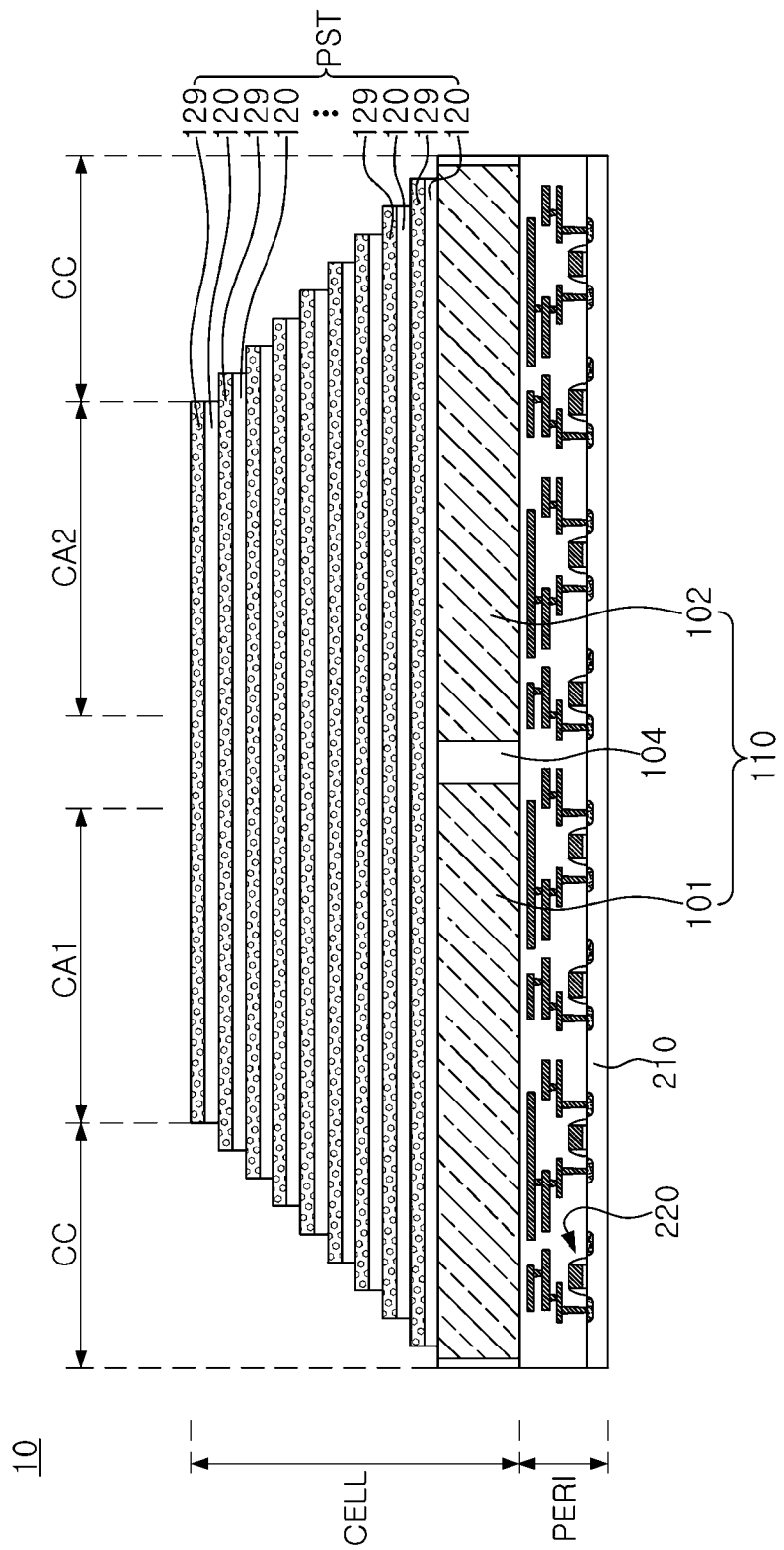
FIGS. 19 to 21 are diagrams illustrating a manufacturing process of a memory device according to an example embodiment of the present disclosure.
Figure 20:
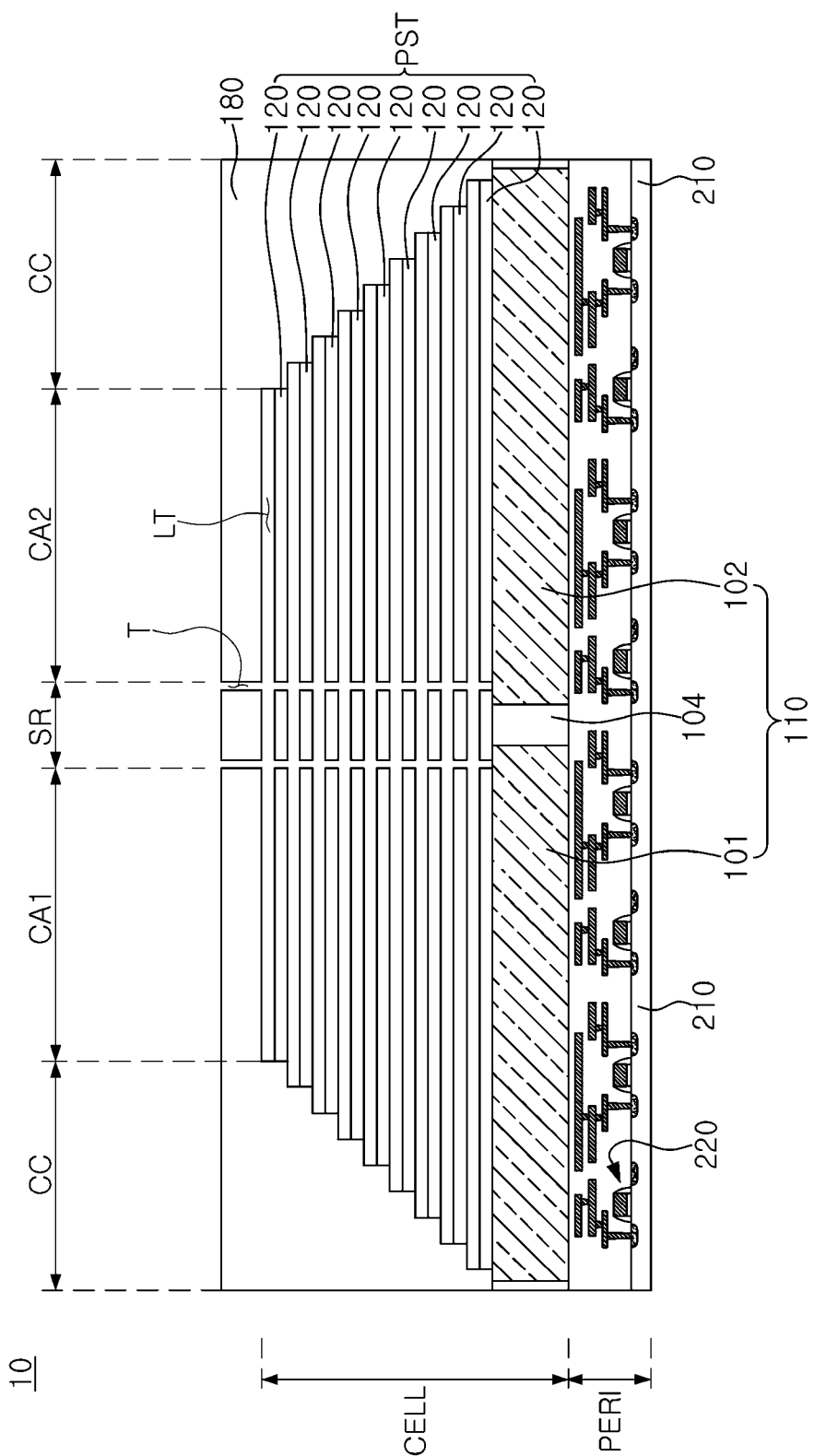
Figure 21:
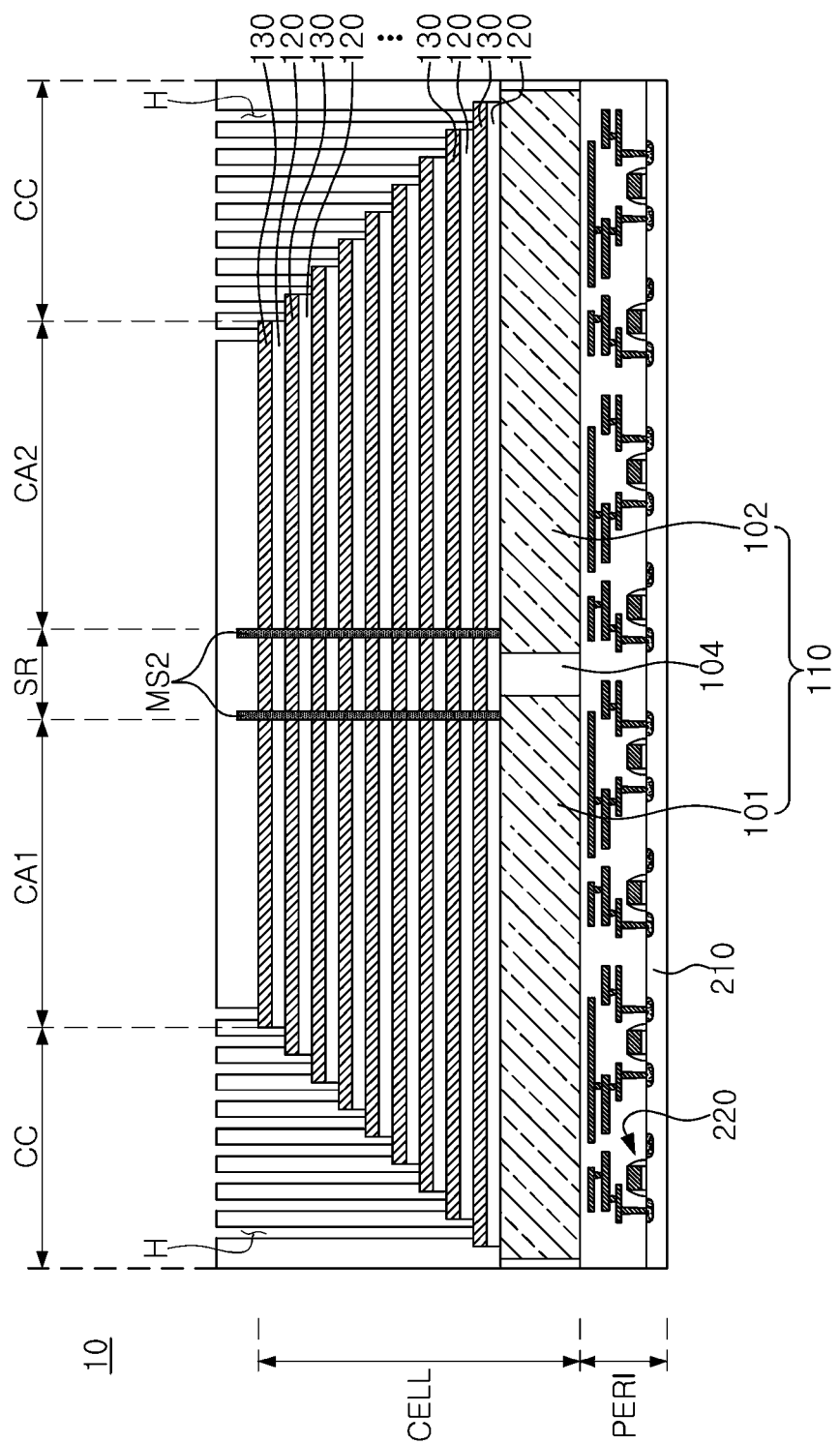

FIGS. 19 to 21 are diagrams illustrating a manufacturing process of a memory device according to an embodiment of the present disclosure.

In a manufacturing process of the memory device 10 according to an embodiment of the present disclosure, before the cell array region is formed on the first substrate 110, the peripheral circuit region PERI including a second substrate 210 and circuit elements 220 below the first substrate 110 may be formed first. Thereafter, a memory cell region CELL may be formed on the first substrate 110, and the memory cell region CELL may be bonded to the peripheral circuit region PERI.

Referring to FIG. 19, the memory device 10 according to an example embodiment may be divided into a first plate portion 101 and a second plate portion 102 by a lower separation region 104. For example, the lower separation region 104 may completely penetrate through the first substrate 110 in the first direction (e.g., the Z direction). The lower separation region 104 may be formed to extend in the third direction (e.g., the Y direction).

Referring to FIG. 3 together with FIG. 19, in the memory device 10 according to an embodiment of the present disclosure, a first cell array region CA1 may be formed in a portion of the first plate portion 101, and a second cell array region CA2 may be formed in a portion of the second plate portion 102.

The sacrificial layers 129 and the interlayer insulating layers 120 may be alternately stacked on the first substrate 110 by a deposition process. The stacked sacrificial layers 129 and the interlayer insulating layers 120 may constitute a preliminary stack structure PST. The thickness of the interlayer insulating layers 120 and the sacrificial layers 129 and the number of layers constituting the interlayer insulating layers 120 and the sacrificial layers 129 may be variously changed from the illustrated ones.

Some of the sacrificial layers 129 and the interlayer insulating layers 120 may be removed so that the sacrificial layers 129 extend to have different lengths in the second direction (e.g., the X direction). For example, in the cell contact regions CC illustrated in FIG. 3, a photolithography process and an etching process may be repeatedly performed on the sacrificial layers 129 so that the upper sacrificial layers 129 extend shorter than the lower sacrificial layers 129. Accordingly, the sacrificial layers 129 in the cell contact regions CC may have a step shape.

Although not illustrated in FIG. 19, referring to FIG. 3, channel structures penetrating through the preliminary stack structure PST may be formed in the cell array regions CA1 and CA2.

Referring to FIG. 20, to form the channel structures, first a capping insulating layer 180 covering at least a portion of an upper portion of the preliminary stack structure PST may be formed. The channel structures may be formed by forming hole-shaped channel holes in trenches formed by performing anisotropic etching to penetrate through the preliminary stack structure PST and then at least partially filling the channel holes. The channel structures may be formed to recess a portion of the first substrate 110.

Next, a gate dielectric layer, a channel layer, a channel insulating layer, and a channel pad may be sequentially formed in the channel holes. The gate dielectric layer may be formed to have a uniform thickness. A channel layer may be formed on the gate dielectric layer in the channel structure. The channel insulating layer may be formed to at least partially fill the channel structure and may be an insulating material.

Still referring to FIG. 20, a mask layer is formed using a photolithography process and the preliminary stack structure PST may be anisotropically etched to form trenches T in a region in which the separation structures MS1_1, MS2 for defining the separation region SR separating the cell array regions CA1 and CA2 are to be formed. Before forming the trenches T, the capping insulating layer 180 may be additionally formed on the channel structures to protect the lower structures.

The trenches T may include first trenches extending in the second direction and second trenches extending in the third direction. The first trenches may separate the sacrificial layers 129 to form a memory block in the third direction. The second trenches may set a boundary between the cell array regions CA1 and CA2 and the separation region SR in the second direction.

The first trench and the second trench may be connected to each other. The first trench may be formed to extend in the second direction from one side of the second trench. The trenches T may be formed on the first plate portion 101 and the second plate portion 102 and may partially recess upper portions of the first plate portion 101 and the second plate portion 102.

The sacrificial layers 129 may be selectively removed with respect to the interlayer insulating layers 120 using, for example, wet etching. Accordingly, a plurality of side openings LT may be formed between the interlayer insulating layers 120, and some sidewalls of the gate dielectric layer of the channel structures and side surfaces of the interlayer insulating layer 120 may be exposed through the side openings LT. In this step, after the sacrificial layers 129 are removed, the stack structure of the interlayer insulating layer 120 may be stably supported by the channel structures.

Referring to FIG. 21, the gate electrode layer 130 may be formed in the side openings LT from which the sacrificial layers 129 have been removed. The gate electrode layer 130 may include a metal, metal nitride, polycrystalline silicon, or metal silicide material. The trenches T may provide a material transfer path for forming the gate electrode layer 130. After the gate electrode layer 130 is formed, the material forming the gate electrode layer 130 deposited in the trenches T may be removed through an additional process.

After the gate electrode layer 130 is formed, the separation structures MS1_1 shown in FIG. 6 and MS2 may be formed in the trenches T. For example, the separation structures MS1_1 and MS2 may include a word line separation structure MS1_1 extending in the second direction and the second separation structure MS2 extending in the third direction.

The word line separation structure MS1_1 may be formed in the first trenches, and the second separation structure MS2 may be formed in the second trenches. The word line separation structure MS1_1 and the second separation structure MS2 may be formed in the same process step and may have substantially the same structure.

Meanwhile, in this step, a plurality of holes H penetrating through the capping insulating layer 180 may be formed. The plurality of holes H may expose a portion of end portions of the gate electrode layers 130 having a step structure in the cell contact region CC. In addition, other holes may be formed in the memory device 10 in the process step of forming the plurality of holes H or in another process step. For example, other holes may be formed in a process step of forming a through-via penetrating through the gate electrode layer 130 and the peripheral circuit region PERI.

Thereafter, a pad structure PAD (see FIGS. 22-25) may be formed in the plurality of holes H, and upper wiring structures such as channel contact plugs and bit lines may be further formed on the channel structures.

For example, the process steps of the memory device 10 described above with reference to FIGS. 19 to 21 may be process steps commonly applied in the manufacturing process of the memory devices 10a and 10b according to embodiments of the present disclosure. However, the manufacturing process of the memory devices 10a and 10b according to embodiments of the present disclosure may further include other process steps performed during or after the process steps described above with reference to FIGS. 19 to 21.

Figure 22:
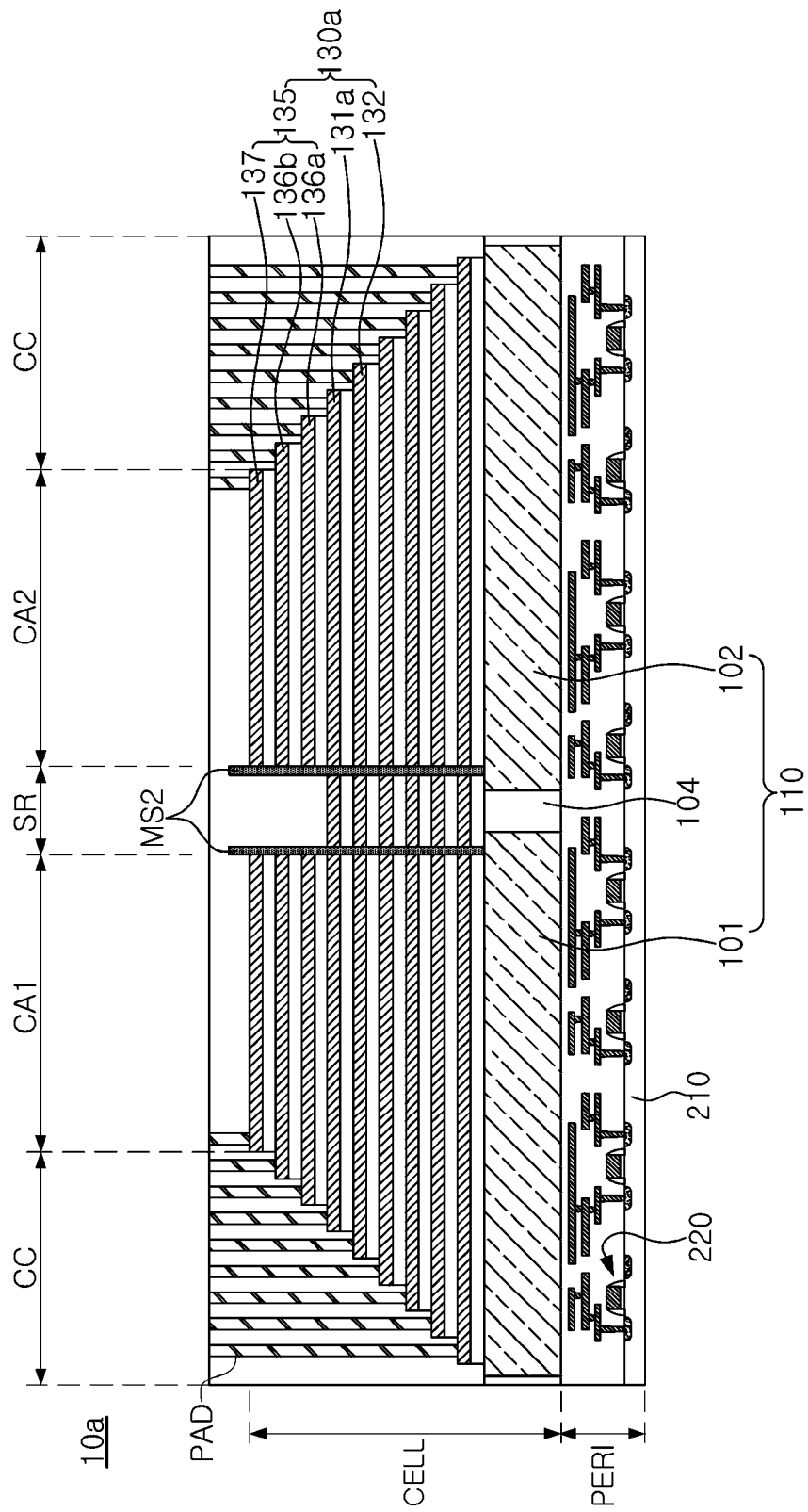
FIGS. 22 and 23 are diagrams illustrating a structure of a memory device according to example embodiments of the present disclosure.
Figure 23:
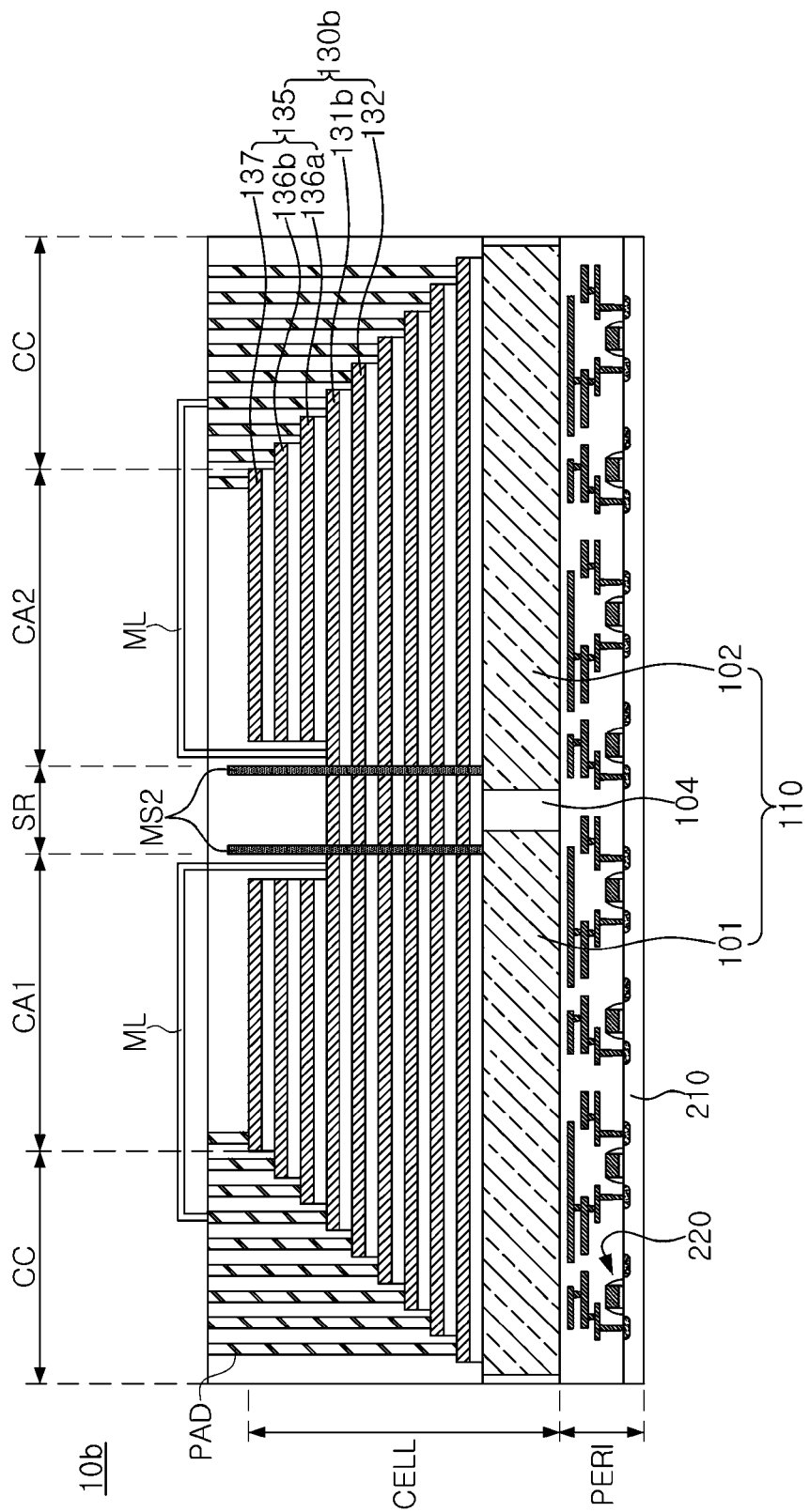

FIGS. 22 and 23 are diagrams illustrating a structure of a memory device according to embodiments of the present disclosure.

Referring to FIG. 22, in the manufacturing process of the memory device 10a according to the example embodiment, a process step of removing a portion of a gate electrode layer 130a corresponding to the gate electrode layer 130 included in the separation region SR during the manufacturing process of the memory device 10 illustrated in FIGS. 19 to 21 may be further performed.

The first electrode layer 131a including a plurality of first word lines may be exposed at a portion from which the gate electrode layer 130a is removed. The second separation structure MS2 may be exposed at a portion from which the gate electrode layer 130a is removed. A boundary of a portion from which the gate electrode layer 130a is removed may be included in the cell array regions CA1 and CA2.

In the memory device 10a according to an embodiment of the present disclosure, first end portions of some of the plurality of first word lines included in the exposed first electrode layer 131a adjacent to the separation region SR may be electrically connected in the third direction. A plurality of first word lines may be on the uppermost portion of the plurality of gate electrode layers 130a in the separation region SR. Accordingly, resistance may be reduced and operating characteristics may be improved.

Referring to FIG. 23, in the manufacturing process of the memory device 10b according to the example embodiment, a process step of removing a portion of the gate electrode layer 130b corresponding to the gate electrode layer 130 included in the separation region SR during the manufacturing process of the memory device 10 illustrated in FIGS. 19 to 21 may be further performed.

The first electrode layer 131b including the plurality of first word lines may be exposed at a portion from which the gate electrode layer 130b is removed. The second separation structure MS2 may be exposed at a portion from which the gate electrode layer 130b is removed. A boundary of the portion from which the gate electrode layer 130b is removed may be included in the cell array regions CA1 and CA2.

However, unlike the memory device 10a of FIG. 22, first end portions of the plurality of first word lines included in the exposed first electrode layer 131b in the memory device 10b adjacent to the separation region SR may be separated in the third direction. A plurality of first word lines may be on the uppermost portion of the plurality of gate electrode layers 130b in the separation region SR.

In the manufacturing process of the memory device 10b according to an embodiment of the present disclosure, a process step of forming the upper metal line ML connecting the first end portions of the plurality of first word lines included in the exposed first electrode layer 131b adjacent to at least one separation region SR to the pad structure PAD connected to the first electrode layer 131b among the pad structures PAD formed in the cell contact region CC may be further performed. For example, the upper metal line may extend in the second direction to cross upper portions of each of the cell array regions CA1 and CA2.

Figure 24:
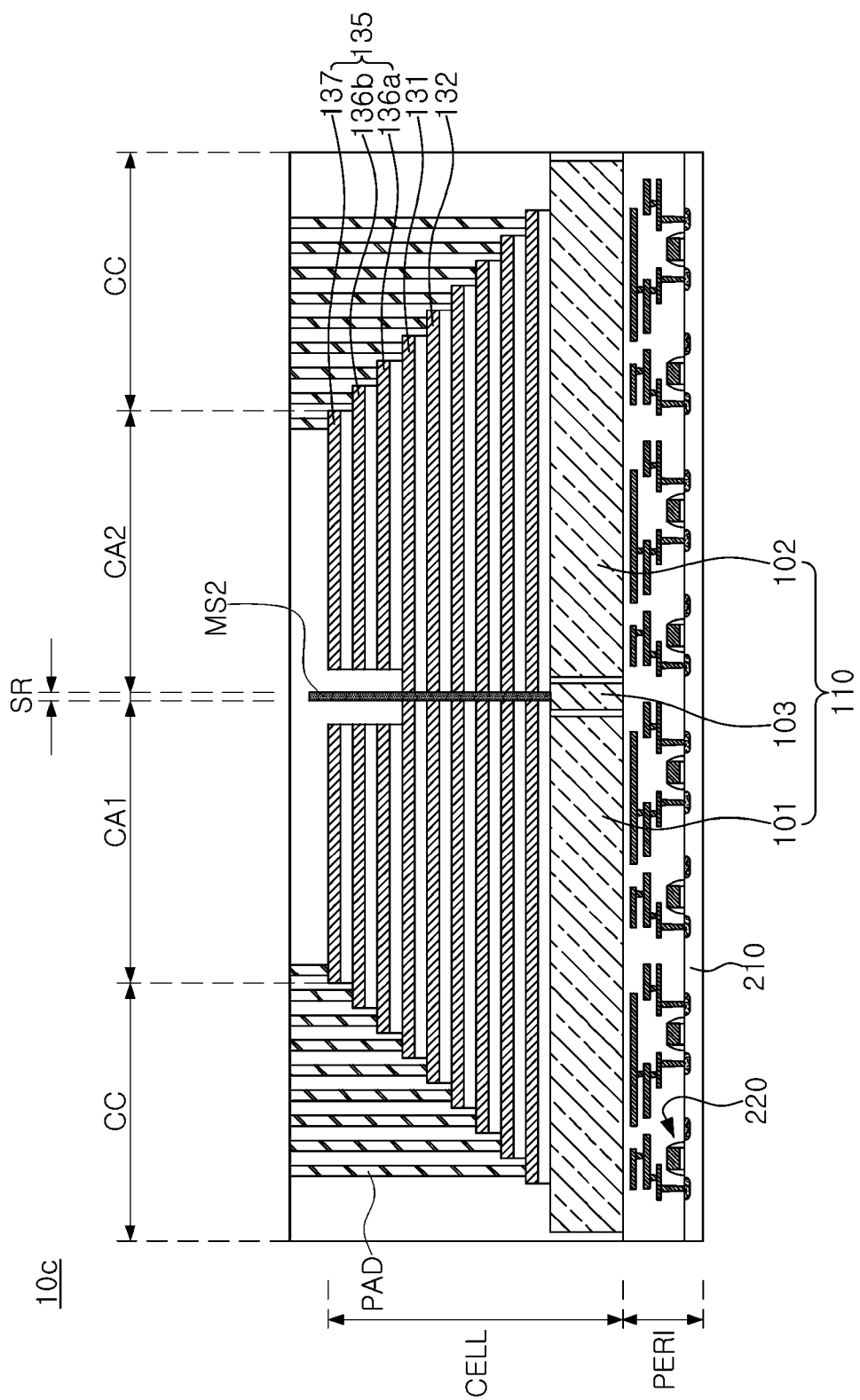
FIGS. 24 and 25 are diagrams illustrating a structure of a memory device according to example embodiments of the present disclosure.
Figure 25:
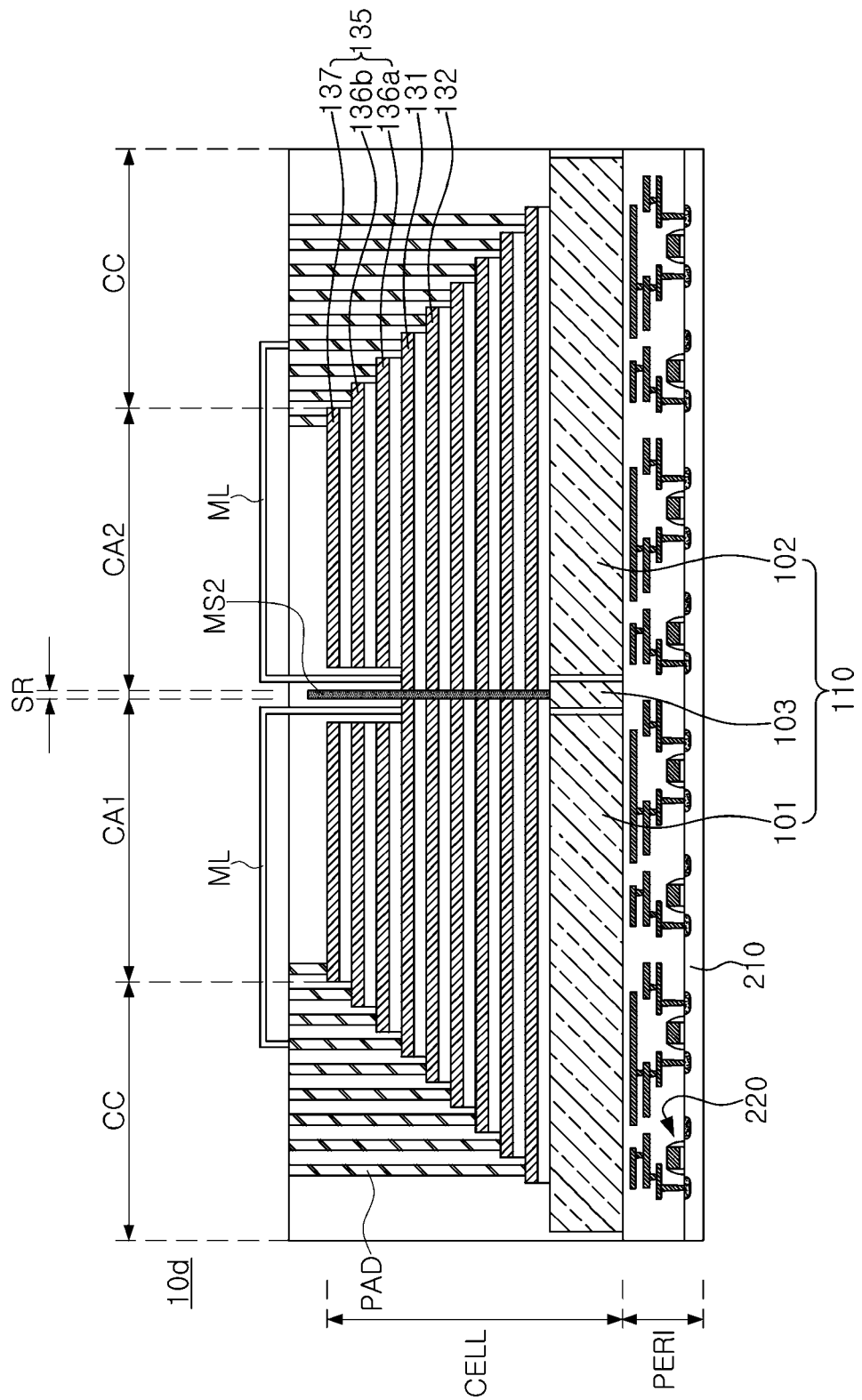

FIGS. 24 and 25 are diagrams illustrating a structure of a memory device according to embodiments of the present disclosure.

Referring to FIGS. 24 and 25, each of the memory devices 10c and 10d according to embodiments of the present disclosure may correspond to the memory devices 10a and 10b illustrated in FIGS. 22 and 23. However, the memory devices 10c and 10d may include only one second separation structure MS2 defining the separation region SR.

For example, in the memory devices 10c and 10d illustrated in FIGS. 24 and 25, the first cell array region CA1 and the second cell array region CA2 may be separated by the separation region SR defined by one second separation structure MS2.

The second separation structure MS2 may be formed on a third plate portion 103 formed between the first plate portion 101 and the second plate portion 102. By including only one second separation structure MS2, the area of the separation region SR may be reduced compared to the memory devices 10a and 10b illustrated in FIGS. 22 and 23, and accordingly, the size of the memory devices 10c and 10d may be further reduced.

However, as the distance between the cell array regions CA1 and CA2 decreases, operating characteristics may not be as good as those of the memory devices 10a and 10b illustrated in FIGS. 22 and 23.

Figure 26:
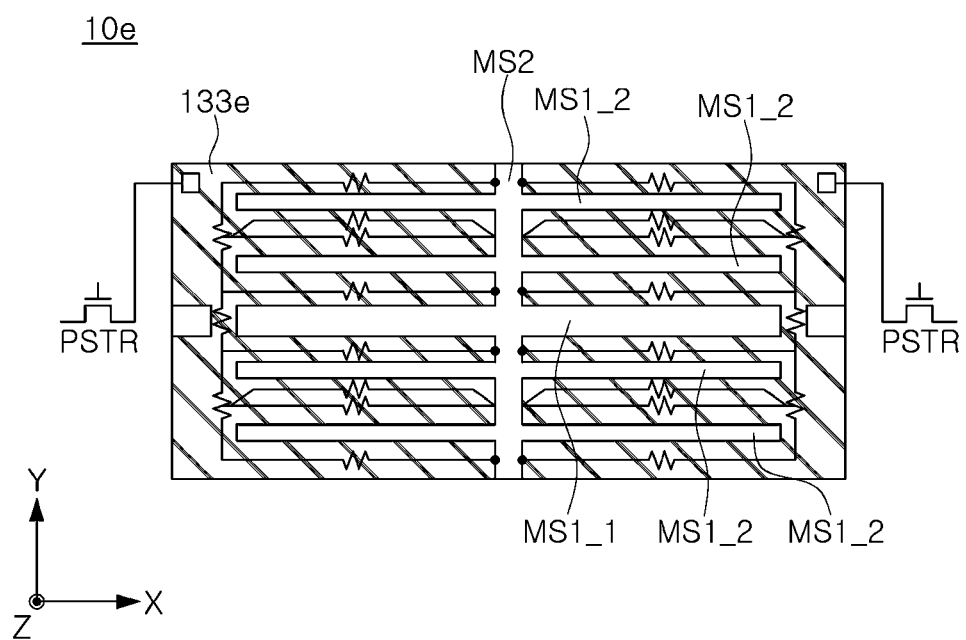
FIGS. 26 and 27 are diagrams illustrating a structure of a memory device according to another example embodiment of the present disclosure.
Figure 27:
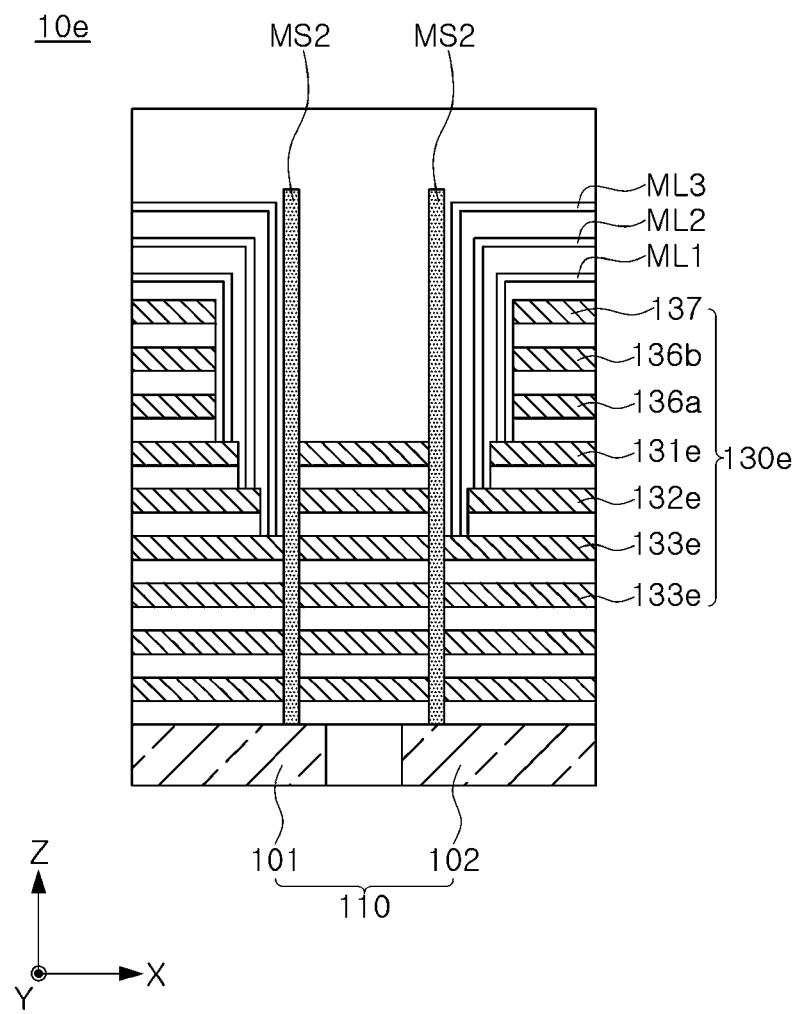

FIGS. 26 and 27 are diagrams illustrating a structure of a memory device according to another embodiment of the present disclosure.

The plurality of gate electrode layers 130e included in the memory device 10e illustrated in FIGS. 26 and 27 may further include a plurality of third electrode layers 133e respectively including a plurality of third word lines below a second electrode layer 132e.

In the memory device 10e according to an embodiment of the present disclosure, some of the first electrode layer 131e, the second electrode layer 132e, and the plurality of third electrode layers 133e are stacked in a step shape in the first cell array region CA1 and the second cell array region CA2 adjacent to the separation region SR, thereby reducing a magnitude of resistance of each of the plurality of gate electrode layers 130e.

For example, in the memory device 10e, the first end portion of at least one of the plurality of word lines respectively included in the plurality of gate electrode layers 130e stacked in a step shape adjacent to the separation region SR may be electrically connected to the respective second end portions of the plurality of gate electrode layers 130e adjacent to the cell contact region CC through the upper metal lines ML1, ML2, and ML3 extending in the second direction.

For example, the first upper metal line ML1 may connect both (opposite) end portions of the first electrode layer 131e similarly to the memory device 10b illustrated in FIG. 13. The second upper metal line ML2 may connect both (opposite) end portions of the second electrode layer 132e below the first electrode layer 131e. The third upper metal line ML3 may connect both (opposite) end portions of the uppermost layer among the plurality of third electrode layers 133e below the second electrode layer 132e.

However, this is only an example and the present disclosure is not limited thereto, and the number of upper metal lines ML1, ML2, and ML3 and types of the plurality of gate electrode layers 130e having a step structure may vary according to embodiments.

In the memory device having the cell array regions separated by the separation region according to an embodiment of the present disclosure, resistance of the word lines may be reduced by changing the structure and connection relationship of the word lines adjacent to the separation region.

The various and beneficial advantages and effects of the present disclosure are not limited to the above, and will be more easily understood in the course of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A memory device comprising:
a first cell array region and a second cell array region each comprising at least one memory block comprising a plurality of gate electrode layers stacked in a first direction perpendicular to an upper surface of a substrate; and
a separation region separating the first cell array region and the second cell array region,
wherein, in the at least one memory block, the plurality of gate electrode layers comprises at least one upper select electrode layer comprising a plurality of string select lines extending in a second direction perpendicular to the first direction and spaced apart from each other in a third direction perpendicular to the first direction, and a first electrode layer comprising a plurality of first word lines arranged below the plurality of string select lines,
wherein the plurality of first word lines respectively comprises first end portions opposite the separation region, second end portions opposite the first end portions and adjacent to the separation region,
wherein the first end portions of the plurality of first word lines are electrically connected to each other through a first connection line extending in the third direction,
wherein at least two of the second end portions of the plurality of first word lines are electrically connected to each other through a second connection line extending in the third direction, and
wherein the second connection line is shorter than the first connection line.

2. The memory device of claim 1, wherein, in the at least one memory block, the plurality of gate electrode layers further comprises a second electrode layer comprising a plurality of second word lines below the plurality of first word lines, and
wherein the first connection line and the second connection line overlap the second electrode layer in the first direction.

3. The memory device of claim 2, wherein the plurality of gate electrode layers further comprises a plurality of third electrode layers stacked in the first direction on the substrate, each of the plurality of third electrode layers comprising a plurality of third word lines below the second electrode layer, and
wherein the first connection line and the second connection line are spaced apart from each other in the second direction.

4. The memory device of claim 2, further comprising a plurality of first separation structures extending in the second direction and at least one second separation structure extending in the third direction, wherein at least one of the plurality of first separation structures separates ones of the second end portions of the plurality of first word lines from each other at an end portion of the first electrode layer adjacent to the separation region, and wherein at least one of the first cell array region or the second cell array region is spaced apart from the separation region by the at least one second separation structure, and
wherein each of the plurality of first word lines and the plurality of second word lines is a dummy word line.

5. The memory device of claim 1, further comprising a plurality of channel structures extending through the plurality of gate electrode layers in the first direction, wherein the at least one memory block is one of a plurality of memory blocks arranged in the third direction, and wherein the at least one upper select electrode layer is one of a plurality of upper select electrode layers stacked and spaced apart from each other in the first direction, and
wherein, in a plan view, the separation region is between, in the second direction, the second end portions of the plurality of first word lines included in the at least one memory block of the first cell array region and the second end portions of the plurality of first word lines included in the at least one memory block of the second cell array region.

6. The memory device of claim 1, wherein the plurality of gate electrode layers further comprises a gate-induced drain leakage (GIDL) electrode layer comprising a plurality of GIDL lines above the plurality of string select lines and on the at least one upper select electrode layer,
wherein first ones of the second end portions of the plurality of first word lines are electrically connected to each other through the second connection line,
wherein second ones of the second end portions of the plurality of first word lines are electrically connected to each other through another second connection line, and
wherein the another second connection line is shorter than the first connection line.

7. A memory device comprising:
a first cell array region and a second cell array region each comprising at least one memory block comprising a plurality of gate electrode layers stacked in a first direction perpendicular to an upper surface of a substrate; and
a separation region separating the first cell array region and the second cell array region,
wherein, in the at least one memory block, the plurality of gate electrode layers comprises:
at least one upper select electrode layer comprising a plurality of string select lines extending in a second direction perpendicular to the first direction and spaced apart from each other in a third direction perpendicular to the first direction; and
a first electrode layer comprising a plurality of first word lines arranged below the plurality of string select lines,
wherein the plurality of first word lines respectively comprises first end portions opposite the separation region, and second end portions opposite the first end portions and adjacent to the separation region,
wherein the first end portions of the plurality of first word lines are electrically connected to each other through a connection line extending in the third direction, and at least one of the second end portions of the plurality of first word lines is electrically connected to one or more of the first end portions through an upper metal line extending in the second direction on an upper portion of the at least one memory block.

8. The memory device of claim 7, wherein the second end portions of the plurality of first word lines are spaced apart from each other in the third direction, and
wherein a first one of the plurality of first word lines and a second one of the plurality of first word lines are spaced apart from the upper surface of the substrate by a same distance.

9. The memory device of claim 7, wherein, in a plan view, the upper metal line extends in the second direction to cross upper portions of a plurality of bit lines extending in the third direction.

10. The memory device of claim 7, wherein the upper metal line comprises a material different from a material of at least one of the plurality of first word lines.

11. The memory device of claim 7, wherein:
the plurality of gate electrode layers further comprises a second electrode layer comprising a plurality of second word lines below the first electrode layer, and a plurality of third electrode layers stacked in the first direction on the substrate, each of the plurality of third electrode layers comprising a plurality of third word lines below the second electrode layer,
the first electrode layer, the second electrode layer, and at least two of the plurality of third electrode layers are stacked in a step shape, and
at least one of the first end portions of the plurality of first word lines is included in the step shape.

12. A memory device comprising:
a first cell array region and a second cell array region each comprising at least one memory block comprising a plurality of gate electrode layers stacked in a first direction perpendicular to an upper surface of a substrate, a plurality of channel structures extending through the plurality of gate electrode layers, and a plurality of first separation structures extending in a second direction perpendicular to the first direction, wherein the at least one memory block is one of a plurality of memory blocks arranged in a third direction perpendicular to the first direction; and
at least one second separation structure extending in the third direction,
wherein, in the at least one memory block, the plurality of gate electrode layers comprises at least one upper select electrode layer comprising a plurality of string select lines extending in the second direction and a first electrode layer comprising a plurality of first word lines below the plurality of string select lines,
wherein the plurality of first word lines respectively comprises first end portions opposite a separation region separating the first cell array region and the second cell array region, and second end portions opposite the first end portions and adjacent to the separation region, and
wherein the first end portions of the plurality of first word lines are electrically connected to each other through a first connection line extending in the third direction.

13. The memory device of claim 12, further comprising a plurality of second connection lines extending in the third direction,
wherein first ones of the second end portions of the plurality of first word lines are electrically connected to each other through a first one of the plurality of second connection lines,
wherein second ones of the second end portions of the plurality of first word lines are electrically connected to each other through a second one of the plurality of second connection lines, and
wherein the first one of the plurality of second connection lines and the second one of the plurality of second connection lines are each shorter in the third direction than the first connection line.

14. The memory device of claim 12, wherein at least one of the second end portions of the plurality of first word lines adjacent to the at least one second separation structure is electrically connected to at least one of the first end portions of the plurality of first word lines through an upper metal line extending in the second direction.

15. The memory device of claim 12, wherein the plurality of gate electrode layers further comprises a plurality of second word lines arranged below the plurality of first word lines, where the plurality of second word lines is a natural number n of second word lines, and a number of each of the plurality of first word lines and the plurality of string select lines is 3n.

16. The memory device of claim 12, wherein:
the plurality of first separation structures comprises a plurality of word line separation structures and a plurality of select line separation structures,
the plurality of word line separation structures and the at least one second separation structure extend in the first direction to extend through the plurality of gate electrode layers,
the plurality of select line separation structures extend into the first electrode layer and are spaced apart from the upper surface of the substrate in the first direction, and
the plurality of select line separation structures and at least one of the plurality of word line separation structures separate ones of the second end portions of the plurality of first word lines from each other at an end portion of the first electrode layer adjacent to the separation region.

17. The memory device of claim 16, wherein one of the plurality of word line separation structures and two of the plurality of select line separation structures alternate with each other in the third direction, and three or more of the plurality of channel structures are between two adjacent word line separation structures among the plurality of word line separation structures.

18. The memory device of claim 12, wherein the at least one second separation structure is a single second separation structure, and wherein the first electrode layer comprises an uppermost layer in the separation region among the plurality of gate electrode layers in the separation region.

19. The memory device of claim 12, further comprising:
a cell contact region on a side surface of each of the first cell array region and the second cell array region in the second direction,
wherein a pass transistor configured to apply an operating voltage to each of the plurality of memory blocks is below the plurality of gate electrode layers extending to the cell contact region.

20. The memory device of claim 12, wherein, in the separation region, a pass transistor configured to apply an operating voltage to each of the plurality of memory blocks is below the plurality of gate electrode layers, and wherein the second end portions of the plurality of first word lines are adjacent to the at least one second separation structure.

\* \* \* \* \*